United States Patent [19]
Etou et al.

[11] Patent Number: 5,159,818
[45] Date of Patent: Nov. 3, 1992

[54] APPARATUS FOR PREPARING A SEMI-FROZEN CONFECTION

[75] Inventors: Ryoukichi Etou; Kinji Hashizume; Mitsuo Ikeda, all of Ibaraki; Hideo Asada, c/o Nissei Refrigeration Ltd. 8-10, 4-chome Sawaraginishi, Ibaraki-shi, Osaka-fu, Japan, 567

[73] Assignee: Hideo Asada, Osaka, Japan

[21] Appl. No.: 664,220

[22] Filed: Mar. 4, 1991

[30] Foreign Application Priority Data

| Aug. 10, 1990 [JP] | Japan | 2-212625 |
| Aug. 10, 1990 [JP] | Japan | 2-212626 |
| Aug. 10, 1990 [JP] | Japan | 2-212627 |
| Feb. 6, 1991 [JP] | Japan | 3-15457 |

[51] Int. Cl.$^5$ .............................. A23G 9/00
[52] U.S. Cl. ........................ 62/137; 62/233; 62/342; 62/390; 222/138
[58] Field of Search ............. 62/342, 343, 390, 137, 62/233; 222/138, 146.6, 135

[56] References Cited

U.S. PATENT DOCUMENTS

| 2,623,658 | 12/1952 | Johansen | 222/138 X |
| 2,689,113 | 9/1954 | Merrill | 62/343 X |
| 3,276,633 | 10/1966 | Rahauser | 62/342 X |
| 4,201,558 | 5/1980 | Schwitters et al. | 62/70 |
| 4,493,441 | 1/1985 | Sedam et al. | 222/146.6 X |
| 4,878,760 | 11/1989 | Newton et al. | 366/149 |
| 4,881,663 | 11/1989 | Seymour | 222/132 |

FOREIGN PATENT DOCUMENTS

2414592 10/1974 European Pat. Off. .
PCTUS8800-909 10/1988 PCT Int'l Appl. .

OTHER PUBLICATIONS

European Search Report U.S. Pat. No. 3,945,614.

Primary Examiner—William E. Wayner
Attorney, Agent, or Firm—David G. Conlin; Ernest V. Linek; Donald R. Castle

[57] ABSTRACT

An apparatus for preparing a semi-frozen confection of the present invention has a freezing cylinder for main ingredient of the semi-frozen confection, and a syrup refrigerating cylinder installed in the vicinity of both a semi-frozen confection dispensing conduit and the freezing cylinder. Accordingly, when preparing a semi-frozen confection composed of, e.g., ice cream and syrup to be served in a cone, rise in the temperature of the ice cream caused by the syrup may be restrained, thereby enabling the semi-frozen confection produced to retain its shape. The apparatus further has a microcomputer for controlling the rotating speed of at least one of the mixers respectively housed in the freezing cylinder and in the syrup refrigerating cylinder. This permits the proportion of, e.g., the ice cream and syrup composing the semi-frozen confection to be varied as desired. The apparatus also has a program selection switch for selecting programs corresponding to preparation conditions that need to be adjusted and a single variable resistor for setting the reference values of the selected programs. The preparation conditions may be thus adjusted through a simple operation by means a simple mechanism.

23 Claims, 27 Drawing Sheets

APPARATUS FOR PREPARING A SEMI-FROZEN CONFECTION

FIELD OF THE INVENTION

The present invention relates to an apparatus for preparing a semi-frozen confection such as a cone ice cream, ice cream, milk shake etc., containing a syrup.

BACKGROUND OF THE INVENTION

Apparatuses for preparing a semi-frozen confection such as a cone ice cream, ice cream, or milk shake, etc., are known in the conventional art. Apparatuses for preparing a semi-frozen confection are usually requested to be capable of preparing several types of semi-frozen confections. Publication for Examined Utility Model Application No. 8702/1985 (Jitsukosho No. 60-8702) discloses an apparatus meeting this demand and equipped with a mechanism enabling to prepare two different types of semi-frozen confections, e.g., milk shakes and cone ice creams. Publication for Examined Utility Model Application No. 44872/1983 and No. 27674/1983 (Jitsukosho No. 58-44872 and No. 58-27674) disclose apparatuses designed such that two types of semi-frozen confections are fed from two semi-frozen confection filling machines, meet in the vicinity of a nozzle and are kept distinct from one another to produce a two-layer product delivered from the nozzle.

Publication for Unexamined Patent Application No. 113858/1990 (Tokukaihei 2-113858), U.S. Pat. Nos. 3,830,407 and 4,378,164, disclose a different kind of apparatus according to which the semi-frozen confection is obtained by mixing the syrup and the ice cream, milk shake or the like. Such apparatuses are even more able to meet the above requirement as they enable the production of a variety of semi-frozen confections by using syrups of different flavors. Such apparatuses are designed such that ice cream that was produced in a freezing cylinder and syrup stored in a syrup tank are delivered to a mixing chamber where they are stirred by means of agitator blades to produce the semi-frozen confection to be dispensed thereafter through an extrusion hole formed in the mixing chamber.

A mechanism for delivering the ice cream and the syrup into a mixing chamber such as described above is disclosed in U.S. Pat. Nos. 3,934,427 and 3,989,492. Here, the ice cream is delivered to the mixing chamber by means of agitator blades provided within an ice cream freezing cylinder. As to the syrup, it is supplied from a syrup tank located apart from the ice cream freezing cylinder by means of pressurized gas such as $CO_2$, pressurized air or a circulating pump.

The syrup tank is in some cases housed in a refrigerated compartment and cooled, whereas in some cases it is not cooled. Cases where the syrup tank is cooled, such as disclosed in Publication for Unexamined Patent Application No. 47148/1986 (Tokukaisho No. 61-47148) offer the advantages that the life of the syrup is extended and, when intermixing the ice cream with the syrup, that the temperature of the ice cream may be prevented from rising.

Recently, the types of syrups employed are more and more diversified. For instance, in response to the growing popularity of natural food, syrups containing fruit juice or fruit pulp are being used. Recent apparatuses for preparing a semi-frozen confection therefore have to be provided with a plurality of syrup tanks to accommodate the different types of syrups and a plurality of syrup conduits connecting the syrup tanks to the mixing chamber.

However, although conventional apparatuses for preparing a semi-frozen confection permits to prepare a milk shake containing syrup without any problem, difficulties are encountered when it comes to prepare a semi-frozen confection composed of ice cream and syrup. Namely, for example, a milk shake is a semi-frozen confection fluid enough to be sucked up through a straw, and is prepared by refrigerating ingredients composing an unflavored shake by means of a freezing cylinder. Here, the temperature of the unflavored shake is approximately $-4°$ C., whereas the temperature of the syrup to be mixed thereto is approximately between $5°$ and $10°$ C. However, as a milk shake is essentially a semi-frozen confection possessing a high fluidity, a slight increase in the fluidity caused by the addition of the syrup of a high temperature, does not represent a serious problem. On the other hand, the temperature of the ice cream at the time of preparation is approximately between $-5°$ and $-8°$ C. The ice cream is less fluid than the above shake and softens as temperature rises. Consequently, the temperature of the ice cream rises when a syrup of a temperature exceeding $0°$ C., e.g. $5°$ to $10°$ C., is mixed thereto. The ice cream is thus unable to retain a proper shape when served on a cone thereby being unfit for sale.

One might think of preparing an ice cream having a low temperature of approximately $-10°$ C. in order to enable the semi-frozen confection made of ice cream and syrup to retain its shape. However, in such a case, the ice cream becomes too hard to be delivered from the freezing cylinder.

On the other hand, refrigerating the syrup to be mixed below $0°$ C. might be considered. However, as mentioned earlier, the syrup is stored in a syrup tank distant from the mixing chamber and is delivered through a syrup conduit by means of pressurized gas, pressurized air or a circulating pump. Consequently, refrigerating the syrup at a low temperature causes the viscosity of the syrup to increase and the delivery of the syrup to the mixing chamber to be difficult. Furthermore, when, as mentioned above, the syrup to be mixed contains fruit pulp, the syrup conduit needs to have a large diameter, causing the delivery of the syrup to be even more difficult.

The development of an apparatus for preparing a semi-frozen confection capable of preparing a suitable semi-frozen confection made of ice cream and syrup and retaining a proper shape, was thus desired.

A conventional apparatus for preparing a semi-frozen confection suffers from another drawback. Namely, the amount of syrup that can be added to a semi-frozen confection such as ice cream is fixed and cannot be changed according to one's taste, the ingredients composing the semi-frozen confection, type of syrup, viscosity of the semi-frozen confection, etc. Controlling the pressure for delivering the syrup in order to adjust the amount of syrup might be considered with the mechanism by means of which the syrup is delivered under pressure. However, in such a case, the mechanism for controlling the pressure becomes complex while an accurate control of the amount of syrup delivered is difficult.

Accordingly, the development of an apparatus for preparing a semi-frozen confection enabling an accurate control of the amount of syrup to be added to the semi-frozen confection by means of a simple mechanism was desired.

Furthermore, with apparatuses for preparing a semi-frozen confection as disclosed in Publication for Unexamined Patent No. 1990/113858 (Tokukaihei 2-113858), U.S. Pat. No. 3,830,407, various conditions have to be controlled when preparing the semi-frozen confection. These preparation conditions include: the temperature and flow of water employed for the preparation of the semi-frozen confection, air temperature, gas pressure and temperature of the compressor, temperature and retention of the temperature of the ingredients of the semi-frozen confection, the value of the current driving the agitator motor depending on the hardness of the semi-frozen confection, etc. In a conventional apparatus, the control of these preparation conditions is executed by means of mechanical or electronic control devices provided for each of the preparation conditions. Here, provision is made such that the control circuits of, for example, the electronic control devices are controlled in an integrated fashion based on predetermined reference values by means of a microcomputer. Each of the reference values required for the above control are set through volume control knobs provided on a board for the input of numerical values, one control knob being provided for each reference value. This board for the input of numerical values occupies a considerable space in the apparatus for preparing a semi-frozen confection.

However, in order to enable an operator to accurately execute the setting operation of the numerical values with his/her fingers, the space occupied by the board for the input of numerical values cannot be reduced. The board for the input of numerical values thus impedes the design of a small sized apparatus. In multifunctional apparatuses such as described above, the items to be controlled for each control circuit are numerous causing the adjusting operations that are performed through the volume control knobs such as adjustment of the resistance, adjustment of the voltage, or adjustment of the current, to be time consuming.

The development of an apparatus for preparing a semi-frozen confection enabling the adjustment of the different conditions for preparing the semi-frozen confection to be executed through a simple manipulation and by means of a simple mechanism was desired.

SUMMARY OF THE INVENTION

An object of the present invention is to provide an apparatus for preparing a semi-frozen confection capable of preparing a suitable semi-frozen confection to be, e.g., served in a cone, made of, e.g., ice cream and syrup retaining a proper shape.

Another object of the present invention is to provide an apparatus for preparing a semi-frozen confection enabling an accurate control of the proportion of a main ingredient and a syrup that constitute the semi-frozen confection to be executed by means of a simple mechanism.

Still another object of the present invention is to provide an apparatus for preparing a semi-frozen confection enabling the adjustment of various conditions for preparing the semi-frozen confection to be executed through a simple manipulation and by means of a simple mechanism.

In order to achieve the above objects, an apparatus for preparing a semi-frozen confection in accordance with the present invention comprises at least:

(a) a semi-frozen confection dispensing conduit provided with a semi-frozen confection dispensing outlet;

(b) a freezing cylinder for main ingredient of the semi-frozen confection that is connected to the semi-frozen confection dispensing conduit and where the raw materials composing the semi-frozen confection are stirred and refrigerated to produce the main ingredient of the semi-frozen confection;

(c) a syrup refrigerating cylinder connected to the semi-frozen confection dispensing conduit, that is mounted in the vicinity of both the semi-frozen confection dispensing conduit and the freezing cylinder for main ingredient of the semi-frozen confection; and (d) syrup delivering means mounted in the syrup refrigerating means.

The apparatus for preparing a semi-frozen confection equipped with the above means may further comprise agitator means mounted in the course of the semi-frozen confection dispensing conduit for stirring the main ingredient of the semi-frozen confection and the syrup as required.

According to the above arrangement, when preparing a semi-frozen confection made of a main ingredient and a syrup, the main ingredient of the semi-frozen confection is prepared by means of the freezing cylinder for main ingredient, and delivered to the semi-frozen confection dispensing conduit thereafter. As to the syrup, it is delivered from the syrup refrigerating cylinder to the conduit through the syrup delivering means, and the semi-frozen confection composed of the main ingredient and the syrup is dispensed from the semi-frozen confection dispensing outlet attached to the conduit.

Here, the syrup refrigerating cylinder is mounted in the vicinity of both the conduit and the freezing cylinder for main ingredient of the semi-frozen confection. Such an arrangement enables the distance for delivering the syrup from the syrup refrigerating cylinder to the outlet to be short. As a result, the syrup delivering means is capable of delivering the syrup to the conduit even if the main ingredient of the semi-frozen confection is constituted by, e.g, ice cream, the syrup is refrigerated below 0° C. by means of the syrup refrigerating cylinder in order to prevent the syrup from causing the temperature of the ice cream to rise, and the viscosity of the syrup is high. This permits the temperature of semi-frozen confection made of refrigerated syrup and ice cream to remain low whereby the semi-frozen confection is able to retain its shape. Moreover, the syrup delivering means is capable of delivering syrup containing fruit pulp without difficulty.

Also, the implementation in the conduit of the agitator means that can be rotated when required enables to selectively produce a semi-frozen confection composed of a mixture of ice cream and syrup, and a two-layer semi-frozen confection made of ice cream and syrup.

In order to achieve the above objects, another apparatus for preparing a semi-frozen confection in accordance with the present invention comprises at least:

(a) a semi-frozen confection dispensing conduit provided with a semi-frozen confection dispensing outlet;

(b) a freezing cylinder for main ingredient of the semi-frozen confection connected to the semi-frozen confection dispensing conduit, where raw materials composing the semi-frozen confection are stirred and refrigerated to produce the main ingredient of the semi-frozen confection;

(c) a first mixer that delivers the main ingredient of the semi-frozen confection prepared by the freezing cylinder for main ingredient of the semi-frozen confection, to the semi-frozen confection dispensing conduit;

(d) first drive means for driving the first mixer to rotate;

(e) a syrup refrigerating cylinder that is connected to the semi-frozen confection dispensing conduit, and that refrigerates the syrup;

(f) a second mixer mounted in the syrup refrigerating cylinder that delivers the syrup to the semi-frozen confection dispensing conduit;

(g) second drive means for driving the second mixer to rotate;

(h) input means for setting the rotating speed ratio of the first mixer and the second mixer; and (i) control means for, when the semi-frozen confection is dispensed from the semi-frozen confection dispensing conduit, controlling the rotating speed of at least one of the first and second drive means in accordance with the rotating speed ratio set through the input means.

With the above arrangement, the main ingredient of the semi-frozen confection is delivered from the freezing cylinder for main ingredient of the semi-frozen confection to the semi-frozen confection dispensing conduit by means of the first mixer. As to the syrup, it is delivered from the syrup refrigerating cylinder to the conduit by means of the second mixer. When the semi-frozen confection is dispensed from the semi-frozen confection dispensing outlet affixed to the conduit, the rotating speed ratio of the first mixer and the second mixer is set through the input means. The control means consequently controls the rotating speed ratio of at least one of the first and second mixers in response to the above rotating speed thereby enabling the proportion of the main ingredient and the syrup composing the semi-frozen confection to be readily and accurately adjusted. The composition ratio of the main ingredient and the syrup may thus be changed according to one's taste, the type or the viscosity of the ingredients, etc.

In order to achieve the above objects, still another apparatus for preparing a semi-frozen confection in accordance with the present invention comprises at least:

(a) various controlled means whose operations during the preparation of the semi-frozen confection are controlled in accordance with preliminary set preparation conditions;

(b) memory means for storing various programs controlling the controlled means and reference values set as preparation conditions;

(c) only one program selection input means for selecting the various programs in an adjustment mode that enables to adjust the various preparation conditions;

(d) only one reference value input means for inputting the reference values;

(e) control means for storing into the memory means the last reference value that was entered through the manipulation of the reference input means, as reference value to be set in the program selected in response to the instruction of the program selection input means, and for controlling the controlled means based on the stored reference values.

With the above arrangement, when adjusting the preparation conditions, a coordinator only needs to select the required program through the program selection input means and to enter the reference value corresponding to that program through the single reference value input means. The control means consequently writes into the memory means the last value that was entered, as reference value to be set in the selected program. The preparation conditions may thus be easily adjusted by means of a simple system. During the preparation of the semi-frozen confection, the control means controls the controlled means based on the reference values stored in the memory means thereby enabling the adequate preparation of a semi-frozen confection, for example composed of two spiraled layers of main ingredient of the semi-frozen confection and syrup.

With the above arrangement, a single switch of the push type may be employed as program selection input means, and a single variable resistor may be employed as reference value input means thereby permitting a significant reduction in size as compared with the conventional board for the input of numerical values.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 14 illustrate an embodiment of the present invention.

FIG. 3(b) is a perspective view of the apparatus for preparing a semi-frozen confection having a freezer door shown in FIG. 3(a) removed for better illustration.

FIG. 5 is a rear elevation of the freezer door.

FIG. 6 is an exploded perspective view illustrating a center plunger shown in FIG. 1(a) and peripheral members thereof.

FIG. 7 is an exploded perspective view illustrating the side plunger shown in FIG. 1(a) and peripheral members thereof.

FIG. 10 is a circuit diagram illustrating a refrigeration system for refrigerating the ice cream cylinder and a comestible tank.

FIG. 11 is a circuit diagram illustrating a refrigeration system for refrigerating first and second syrup cylinders and syrup tanks.

FIG. 12 is a front view illustrating a semi-frozen confection composed of a mixture of ice cream and syrup prepared by having a mixer shown in FIG. 4(a) rotate.

FIG. 13 is a front view illustrating a two-layer semi-frozen confection composed of ice cream and syrup prepared without having the mixer shown in FIG. 4(a) rotate.

FIG. 14 is a block diagram illustrating the organization of essential parts composing the control circuit of the apparatus for preparing a semi-frozen confection.

FIGS. 16(a( and (b) are flow charts illustrating the control operation executed by a CPU shown in FIG. 15(a) in the adjustment mode.

FIG. 17 is a front elevation illustrating a displays group, a switches group, a variable resistors group and a LEDs group.

FIG. 18 is a front elevation illustrating main instruction switches group and LEDs group related to an ice cream cylinder and disposed on a display section 9 shown in FIG. 2(b).

FIG. 19 is a front elevation illustrating sub instruction switches group and LEDs group related to first and second syrup cylinders and disposed on a display section 8 shown in FIG. 2(b).

DETAILED DESCRIPTION OF THE EMBODIMENTS

First Embodiment

An embodiment of the present invention will be described hereinbelow with reference to FIGS. 1 to 14.

External configuration of an apparatus for preparing a semi-frozen confection

Figure 3A:
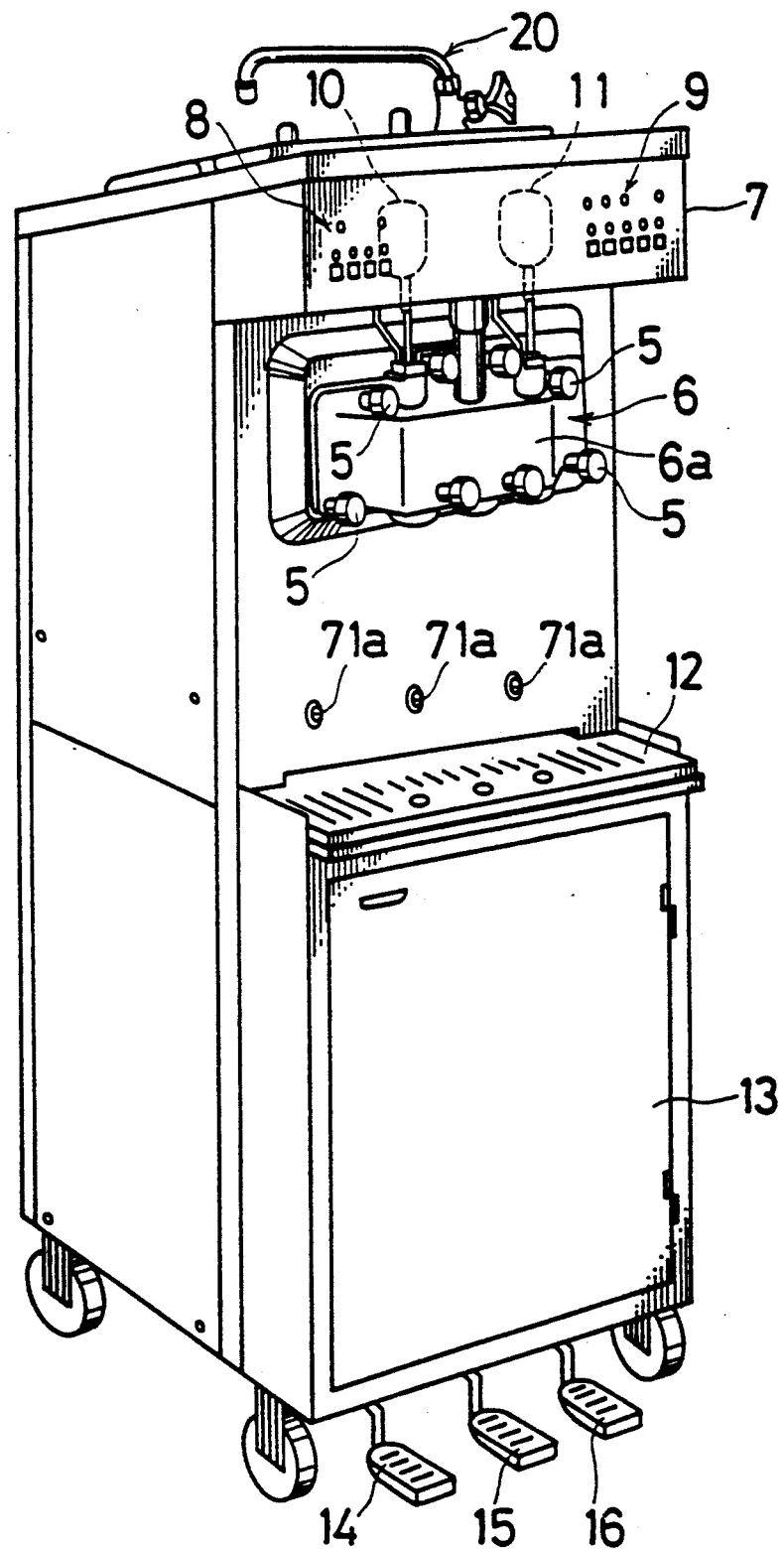
FIG. 3(a) is a perspective view showing the external appearance of the apparatus for preparing a semi-frozen confection.
Figure 3:
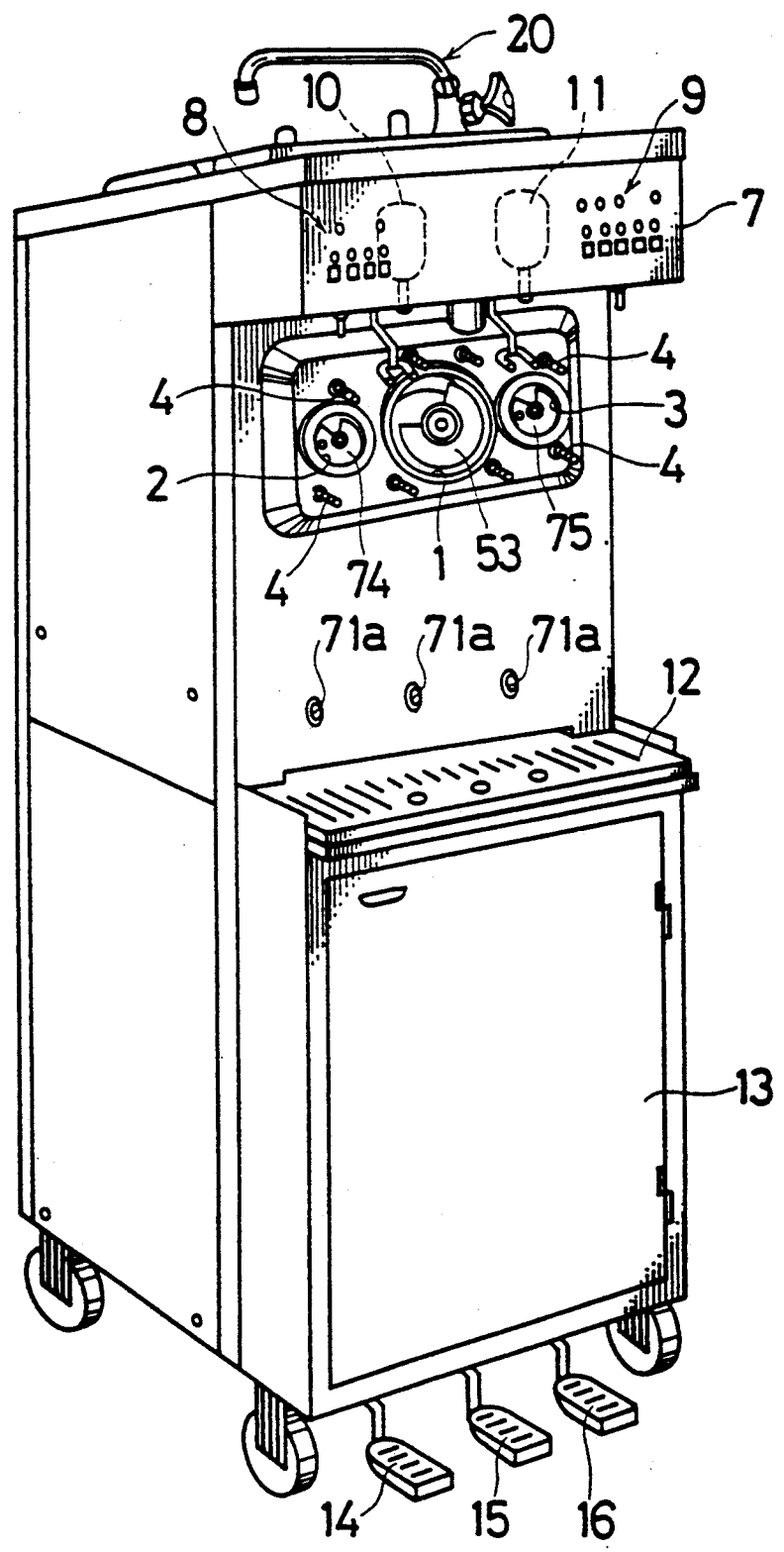
Figure 3C:
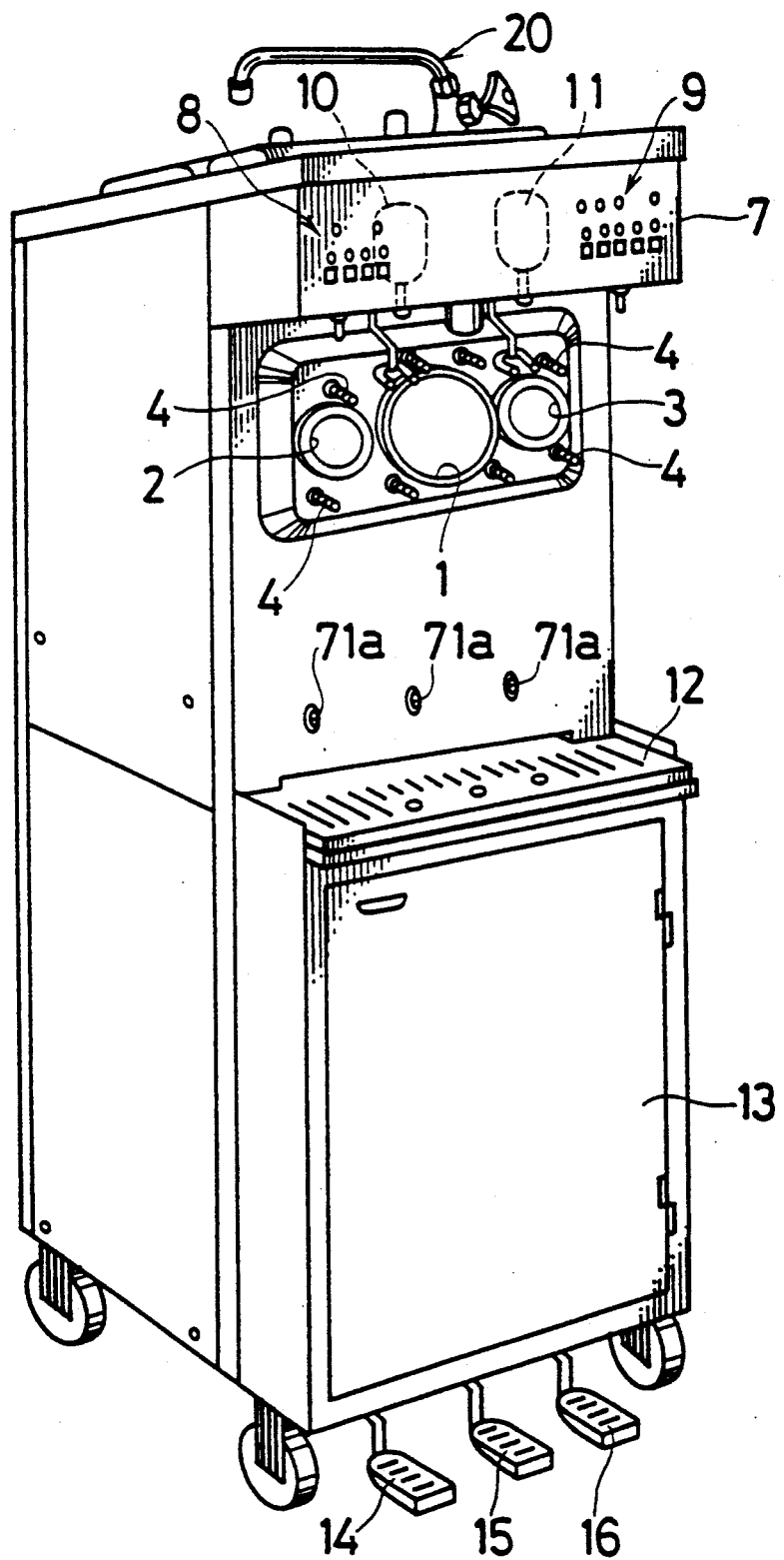
FIG. 3(c) is a perspective view of the apparatus for preparing a semi-frozen confection having the dasher of each of cylinders shown in FIG. 3(b) removed for better illustration.

The exterior of an apparatus for preparing a semi-frozen confection in accordance with the present invention is illustrated in FIG. 3(a). FIG. 3(b) shows the apparatus having a freezer door 6 mounted at the front of the apparatus detached by removing nuts 5. FIG. 3(c) illustrates the apparatus as shown in FIG. 3(b) further having dashers 53, 74 and 75 housed within cylinders 1 to 3, to be described later, removed.

Figure 2A:
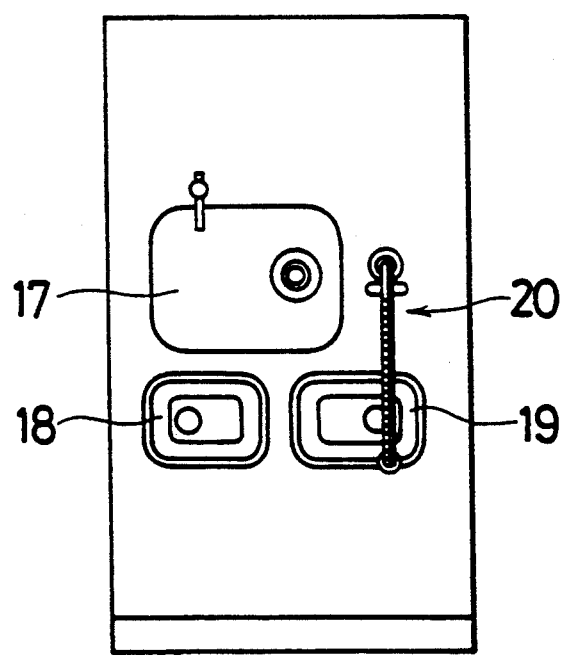
FIG. 2(a) is a plan view illustrating an apparatus for preparing a semi-frozen confection.

As shown in FIGS. 3(b) and (c), a cylinder 1 is located in the central portion of the rear side of the freezer door 6. The cylinder 1 is the freezing cylinder for main ingredient of the semi-frozen confection, wherein ice cream, i.e., the main ingredient of the semi-frozen confection, is prepared. A first syrup cylinder 2 and a second syrup cylinder 3 serving as syrup refrigerating cylinders, are respectively installed on each side of the cylinder 1. Here, it is an essential feature of the present invention that the first syrup cylinder 2 and second syrup cylinder 3 are mounted in close proximity to and aligned with the ice cream cylinder 1. As illustrated in FIG. 3(a), the front ends of the cylinders 1 to 3 are covered by the freezer door 6. The freezer door 6 is affixed to the front side of the main body of the apparatus by means of a plurality of bolts 4 shown in FIGS. 3(b) and (c), and a plurality of nuts 5 shown in FIGS. 2(b) and (c) and FIG. 3(a). On the front side of a protruding section 7 located upwardly from the freezer door 6, there are provided displays 8 and 9 for displaying the operating condition of the apparatus, etc. Mixer motors 10 and 11, to be described later, are housed inside of the protruding section 7. Below the freezer door 6, there is disposed a draining board 12 for catching the drain. A door 13 is mounted below the draining board 12 and enables to open the lower section of the apparatus. Three pedals 14 to 16, to be described later, are mounted below the door 13. As shown in FIG. 2(a), at the top of the apparatus there are disposed one comestible tank 17 wherein a comestible that constitute the raw material of the main ingredient is stored, two syrup tanks 18 and 19 wherein syrups are stored, and a water supply device 20 that permits to deliver wash water inside the tanks 17, 18 and 19. The syrup tanks 18 and 19 may store syrups composed of different ingredients such as for example a syrup containing fruit pulp, a syrup containing fruit juice, a syrup containing fruit pulp and fruit juice, a syrup containing jam, etc. The syrup tanks 18 and 19 may as well store syrups having a different substance such as a liquid syrup, a syrup paste, etc.

Detailed Configuration of the Vicinity of the Cylinders

Figure 1A:
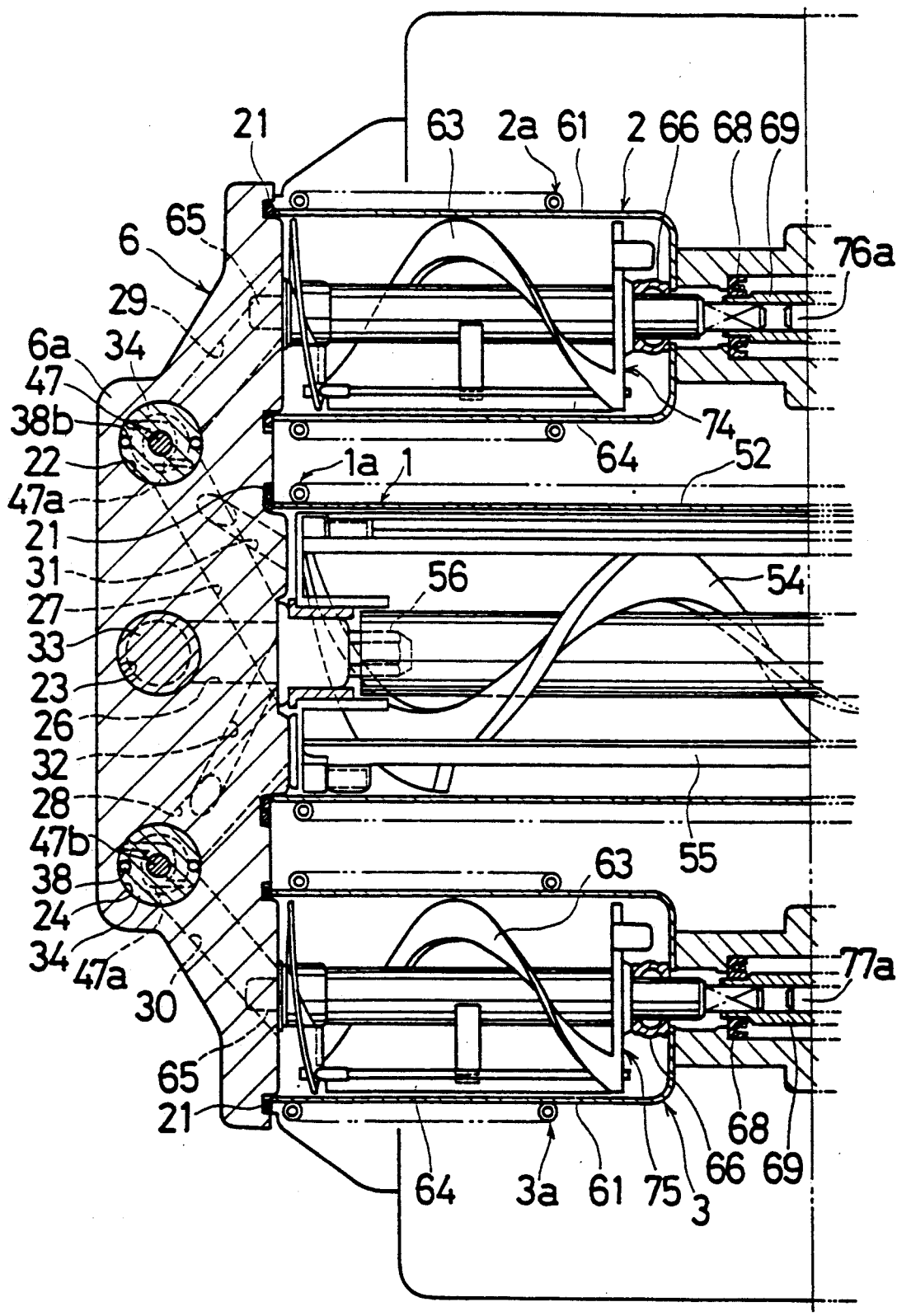
FIG. 1(a) and (b) are sectional views of an apparatus for preparing a semi-frozen confection shown in FIG. 2(b) taken along line A—A of FIG. 2(b).
Figure 1B:
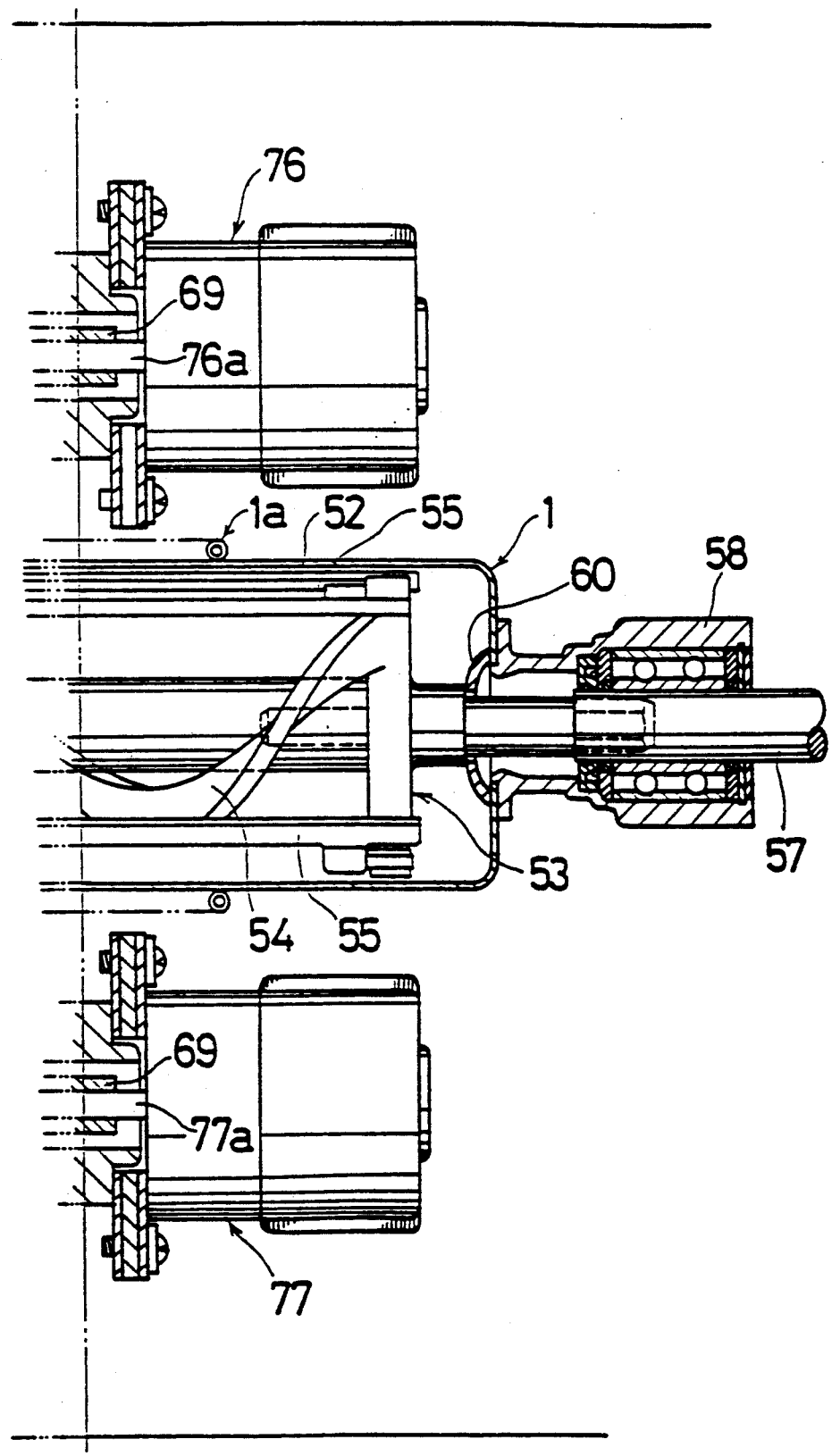
Figure 4A:
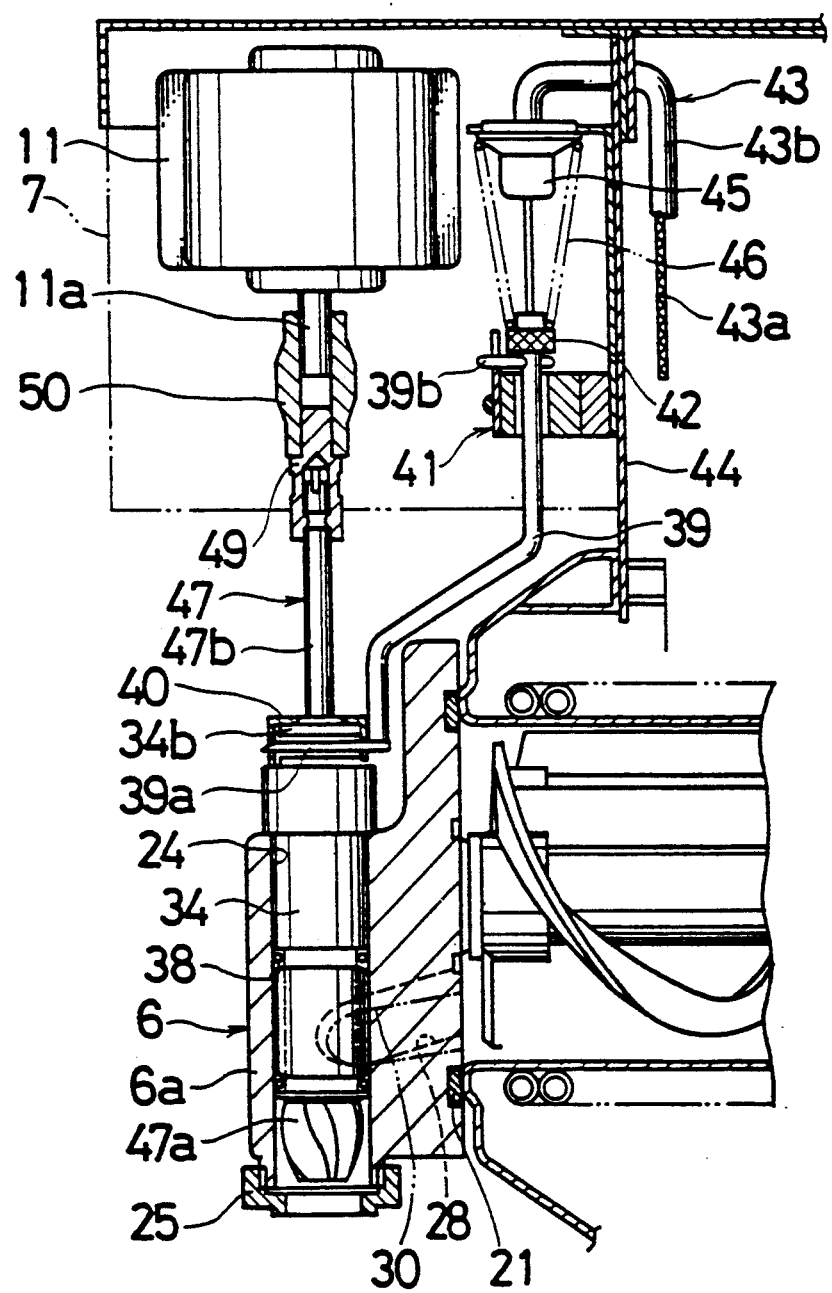
FIG. 4(a), is a sectional view of the apparatus for preparing a semi-frozen confection shown in FIG. 2(b) taken along line B—B of FIG. 2(b).
Figure 5:
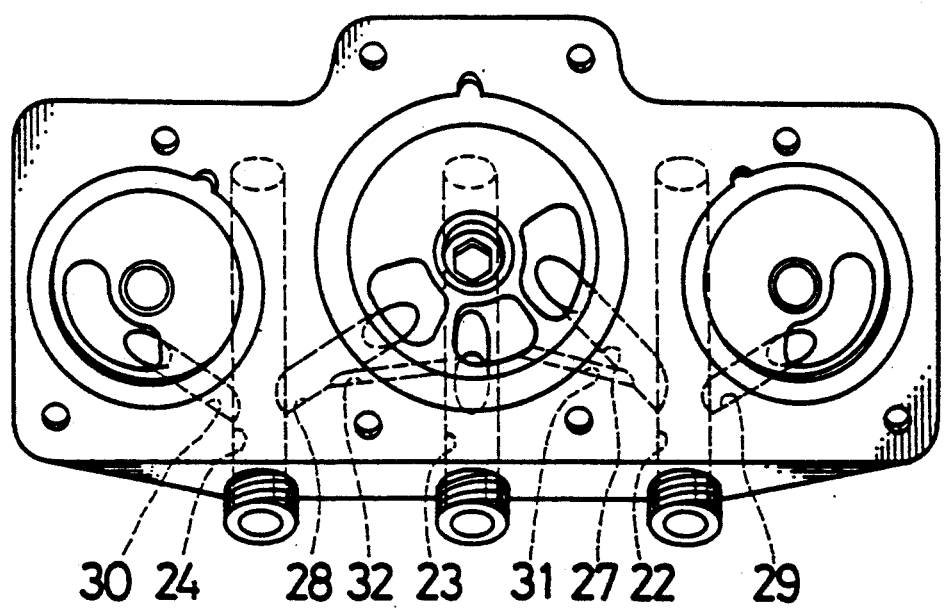

As illustrated in FIGS. 1(a) and (b), gaskets 21 respectively fitting the circumference of each of the cylinders 1 to 3 are affixed to the freezer door 6. The freezer door 6 and the outlet end of each of the cylinders 1 to 3 are sealingly closed through each gasket 21. The freezer door 6 is provided on its front wall with a protruding section 6a projecting forwards. Three through holes 22 to 24 extend vertically inside the protruding section 6a (the vertical cross-section of the through hole 24 is best illustrated in FIGS. 4(a) and (b)). The three through holes 22 to 24 are aligned in a side to side direction of the protruding section 6a. As illustrated in FIGS. 4(a) and (b), a shaping outlet 25 that serves as dispensing outlet for the semi-frozen confection, is affixed to the lower end of each of the through holes 22 to 24. As shown in FIGS. 1(a) and (b) and FIG. 5, the through hole 23, i.e., ice cream dispensing conduit, is mounted such as to intersect the central axis of the cylinder 1. As to the through holes 22 and 24 that serve as dispensing conduits for the semi-frozen confection made of ice cream and syrup, they are respectively disposed between the cylinder 1 and the first cylinder 2, and between the cylinder 1 and the second cylinder 3. As shown in FIG. 1(a), the through hole 23 communicates with the cylinder 1 through a first ice cream passageway 26. As shown in FIGS. 1(a) and (b) and FIG. 5 (here, FIG. 5 is a view taken from the rear of the freezer door 6), the through hole 22 communicates with the cylinder 1 through a second ice cream passageway 27 and communicates with the first cylinder 2 through a first syrup passageway 29. As to the through hole 24, it communicates with the cylinder 1 through a third ice cream passageway 28 and communicates with the second cylinder 3 through a second syrup passageway 30.

An essential feature of the present invention lies in the fact that the first syrup cylinder 2 is installed in close proximity to the ice cream cylinder 1 thereby enabling the first cylinder 2 to be installed in close proximity to the through hole 22. Such an arrangement permits the first syrup passageway 29 to be remarkably short whereby even a syrup of a high viscosity may be delivered easily therethrough to the through hole 22. The same can be said about the second cylinder 3.

The central portion of the second ice cream passageway 27 and the cylinder 1 communicate through a first by-pass 31, while similarly, the central portion of the third ice cream passageway 28 and the cylinder 1 communicate through a second by-pass 32. The first and second by-passes 31 and 32 are designed to send the ice cream remaining in the second ice cream passageway 27 or third ice cream passageway 28 back to the cylinder 1. In concrete terms, in order to deliver the ice cream from the cylinder 1 to the through hole 24, a side plunger 34, to be described later, vertically reciprocates inside the through hole 24. As a result, when the outlet of the third ice cream 28 communicating with the through hole 24 is closed due to the side plunger 24, the ice cream remaining inside the third ice cream passageway 28 is sent back to the cylinder 1 through the second by-pass 32, thereby permitting to prevent the temperature of the ice cream in the third ice cream passage way 28 from rising.

Figure 6:
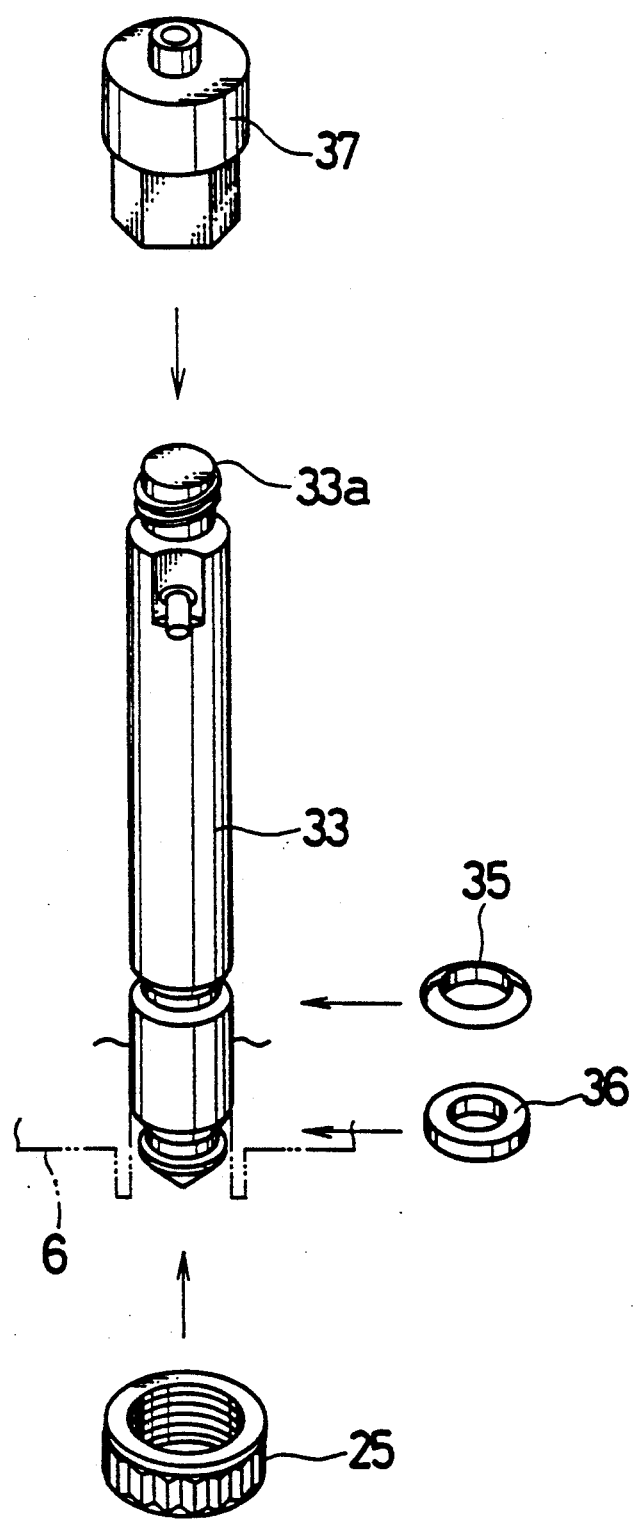

A center plunger 33 of a cylindrical shape and shown in FIG. 6 is slidably fitted inside the through hole 23. The center plunger 33 is provided on its upper end with a threaded portion 33a. An O-ring 35 is fitted on the lower portion of the center plunger 33 and a ring 36 is fitted in the vicinity of the lower end of the same. A coupling member 37 is screwed on the threaded portion 33a and the center plunger 33 is connected to the pedal 15 by means of the coupling member 37 through a wire cable, not shown. A helical spring, not shown, designed to push the center plunger 33 downwards is disposed between the coupling member 37 and a supporting member located on the main body of the apparatus for preparing a semi-frozen confection. Accordingly, the outlet of the first ice cream passageway 26 communicating with the through hole 23 is opened/closed, as the user depresses/releases the pedal 15 enabling the plunger 33 to be lifted/lowered.

Figure 7:
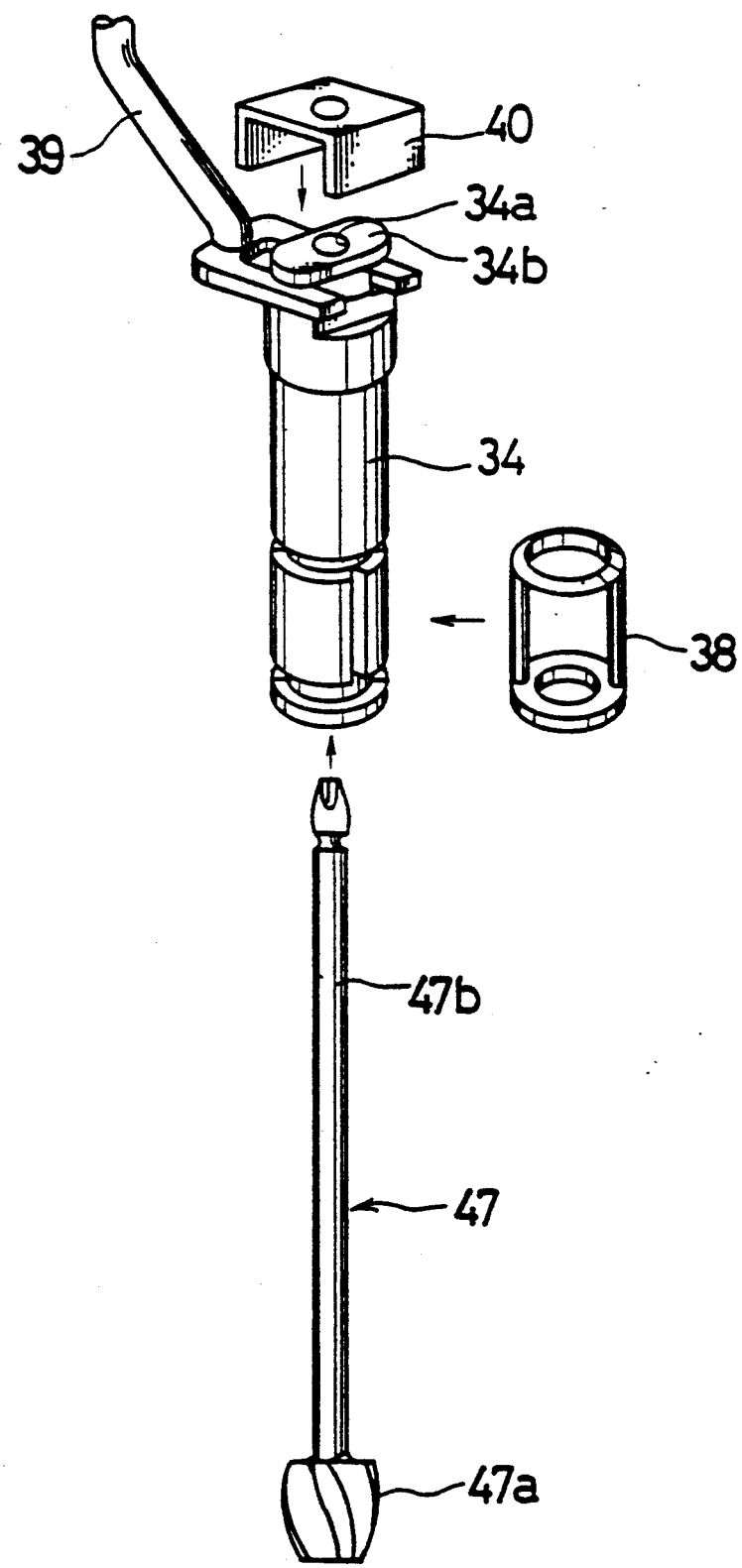

The side plunger 34 shown in FIGS. 4(a) and (b) and FIG. 7, is slidably fitted inside the through hole 24. As illustrated in FIG. 7, a through hole 34a is formed in the side plunger 34 in the axial direction thereof, and a seal member, e.g., an O-ring 38 of the H type is fitted on the lower portion thereof. A lifter connecting section 34b is formed at the upper end of the side plunger 34. A forked section 39a formed at the lower end of a plunger lifter 39, also shown in FIGS. 8(a) and (b), is coupled to the lifter connecting section 34b. A plunger clip 40 for preventing the side plunger 34 from rotating is mounted on the lifter connecting section 34b.

Figure 4B:
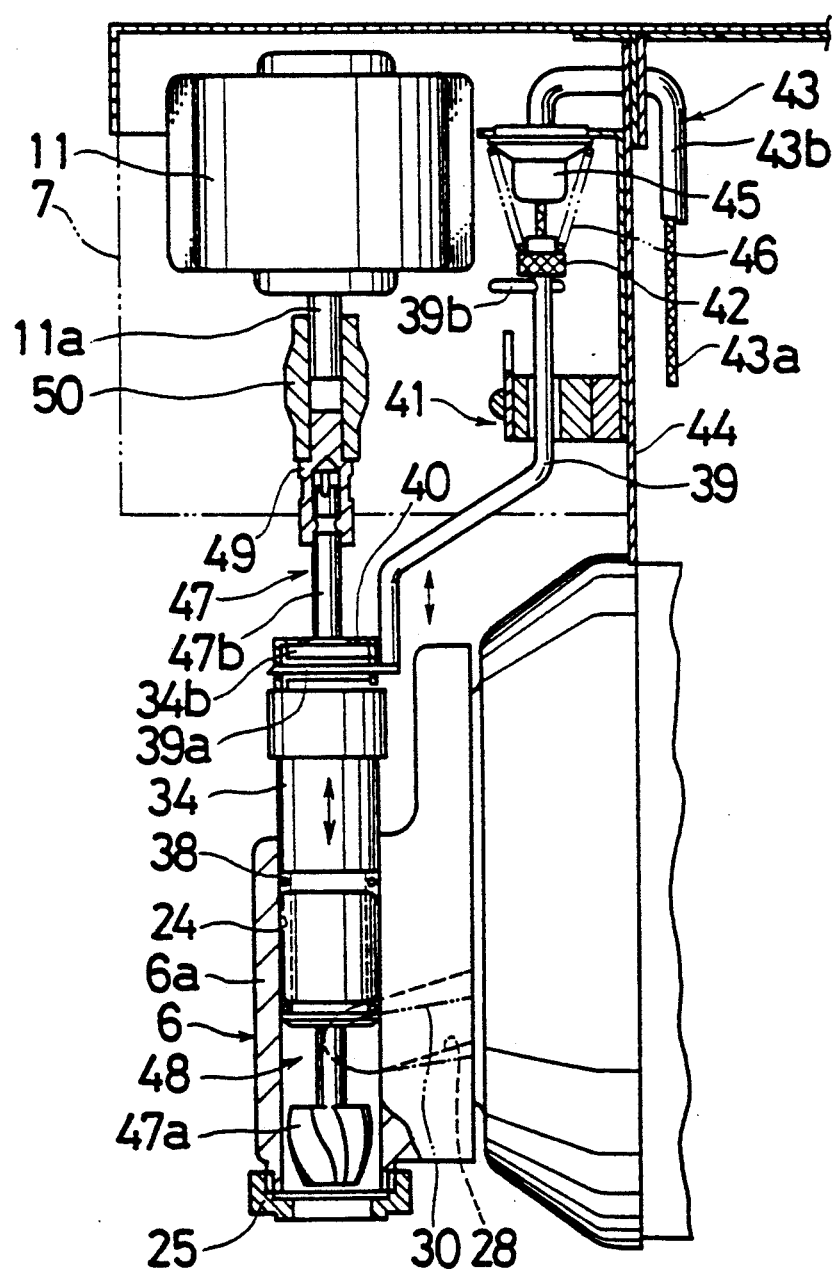
FIG. 4(b) is a fragmentary sectional view illustrating a side plunger shown in FIG. 4(a) in a raised position.
Figure 8A:
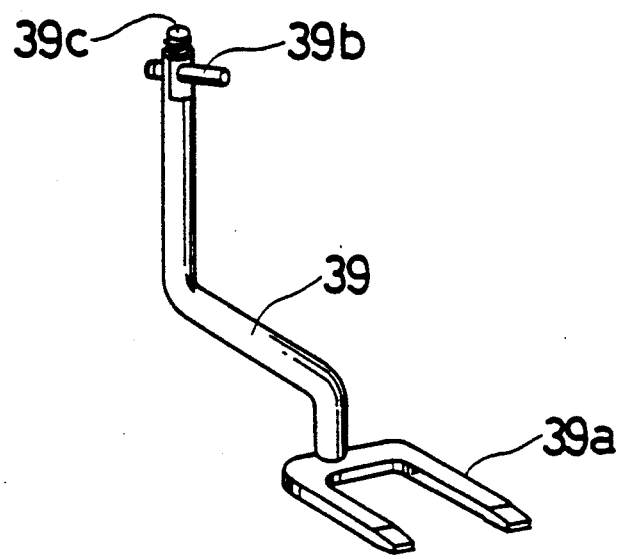
FIG. 8(a) is a perspective view illustrating a plunger lifter shown in FIG. 7.
Figure 8B:
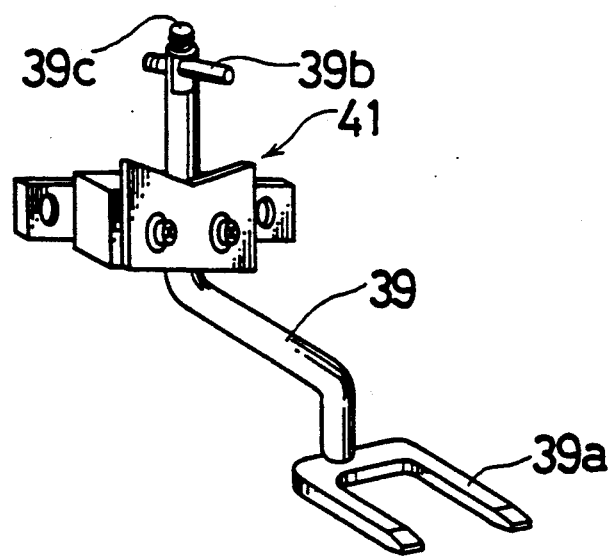
FIG. 8(b) is a perspective view illustrating the plunger lifter supported by a bracket.

As shown in FIGS. 4(a) and (b) and FIG. 8, the upper section of the plunger lifter 39 is installed such as to be able to slide up and down through a bracket 41 that is fixed to a support panel 44 located inside the protruding section 7 mentioned earlier. A stud pin 39b is mounted such as to pierce horizontally the plunger lifter 39 at the upper section thereof. The stud pin 39b enables to control the drop of the plunger lifter 39 by coming into contact with the bracket 41. As shown in FIGS. 8(a) and (b), a threaded portion 39c is formed at the upper end of the plunger lifter 39. As shown in FIGS. 4(a) and (b), a coupling member 42 is screwed to the threaded portion 39c. An inner wire 43a of a cable wire 43 is connected to the coupling member 42. A spring support 45 attached to the support panel 44, is disposed above the coupling member 42. An outer cable 43b of the wire cable 43 is fastened to the spring support 45. A helical spring 46 is disposed between the spring support 45 and the coupling member 42. The other end of the inner cable 43a of the wire cable 43 is connected to the pedal 16. Such an arrangement enables the side plunger 34 to be lifted/lowered as the user depresses/releases the pedal 16. The rise/drop of the side plunger 34 cause the outlets of the third ice cream passageway 28 and the second syrup passageway 30 communicating with the through hole 24, to open/close. As shown in FIG. 4(b), when the side plunger 34 is lifted inside the through hole 24, the space produced between the side plunger 34 and the shaping outlet 25 forms a mixing chamber 48 where the ice cream and the syrup are mixed.

As illustrated in FIG. 7, a shaft 47b of a mixer 47 is rotatably inserted through the through hole 34a of the side plunger 34 and the plunger clip 40. Provision is made such that the side plunger 34 is capable of sliding up and down along the shaft 47b. The mixer 47 is provided with agitator blades 47a accommodated at the lower end thereof. As shown in FIG. 4(b), the upper end of the shaft 47b is coupled with a drive shaft 11a of the mixer motor 11 through a socket 49 and a coupling member 50. Similar mechanisms for lifting and lowering the side plunger 34 and for rotating the mixer 47 are installed on the through hole 22 side. However, in the case of the through hole 22, the side plunger 34 is lifted and lowered through the operation of the pedal 14 and enables the outlets of the second ice cream passageway 27 and the first syrup passageway 29 that communicate with the through hole 22, to be opened and closed. Moreover, the mixer 47 located on the through hole 22 side is driven by the mixer motor 10.

As shown in FIGS. 1(a) and (b), the cylinder 1 comprises the dasher 53, adopted as first mixer, housed inside a hollow cylinder frame 52. The dasher 53 is provided with scraper blades 55 embracing a helix-shaped agitator blade 54. The scraper blades 55 enable to scratch off the comestible frozen and adhering to the inner wall of the cylinder frame 52. The dasher 53 is rotatably supported at the forward end thereof by a supporting shaft 56, while its rear end pierces a sealing member 60, protrudes outwardly and is supported by a bearing 58 through a coupling shaft 57. A dasher motor 73, i.e., first drive means to be described later adopted for driving the dasher 53, is connected to the coupling shaft 57. Refrigeration piping 1a is wound around the outer circumference of the cylinder frame 52.

The first cylinder 2 is provided with the dasher 74 adopted as second mixer and housed in a cylinder frame 61, while the second cylinder 3 is provided with the dasher 75 adopted as second mixer. The dasher 74 is provided with scraper blades 64 embracing an agitator blade 63. The dasher 74 is rotatably supported at the forward end thereof by a supporting shaft 65, while its rear end pierces a sealing member 66, protrudes outwardly and is connected to a drive shaft 76a of a dasher motor 76 through a coupling member 69 sealed by a shaft seal 68. The dasher 75 has a configuration similar to that of the dasher 74 apart that the rear end thereof is coupled with a drive shaft 77a of a dasher motor 77. Refrigeration pipings 2a and 3a are respectively wound around the cylinder frame 61 of both the first cylinder 2 and the second cylinder 3.

Figure 9A:
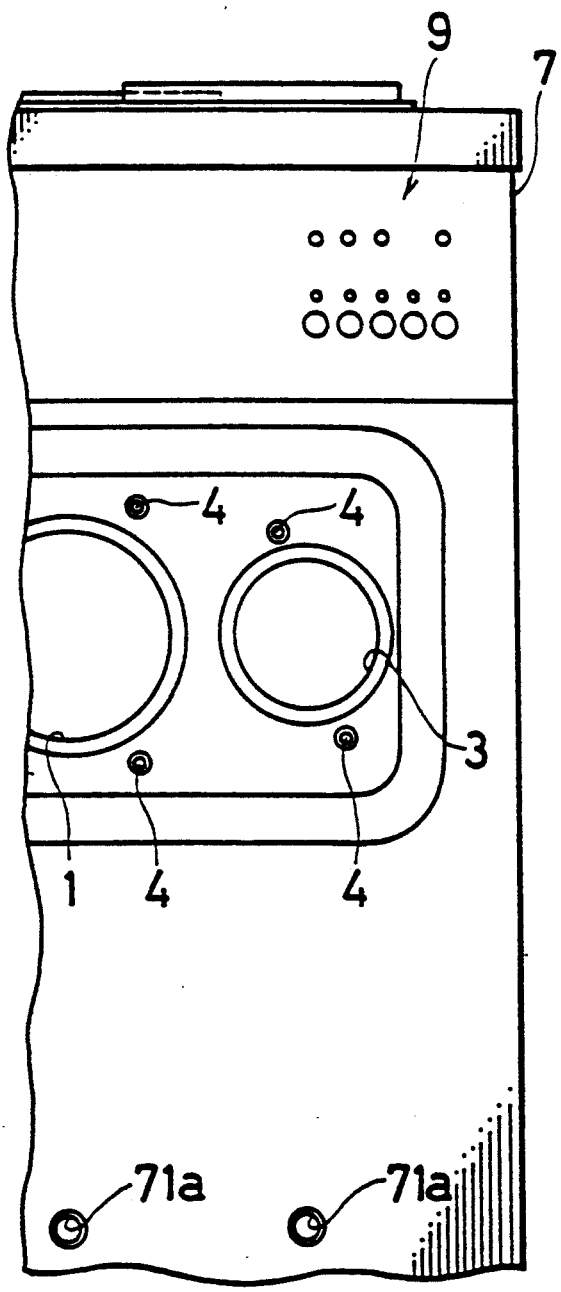
FIG. 9(a) is a front view illustrating essential parts of the configuration in the vicinity of an ice cream cylinder and a second syrup cylinder and having the freezer door of the apparatus for preparing a semi-frozen confection removed for better illustration.
Figure 9B:
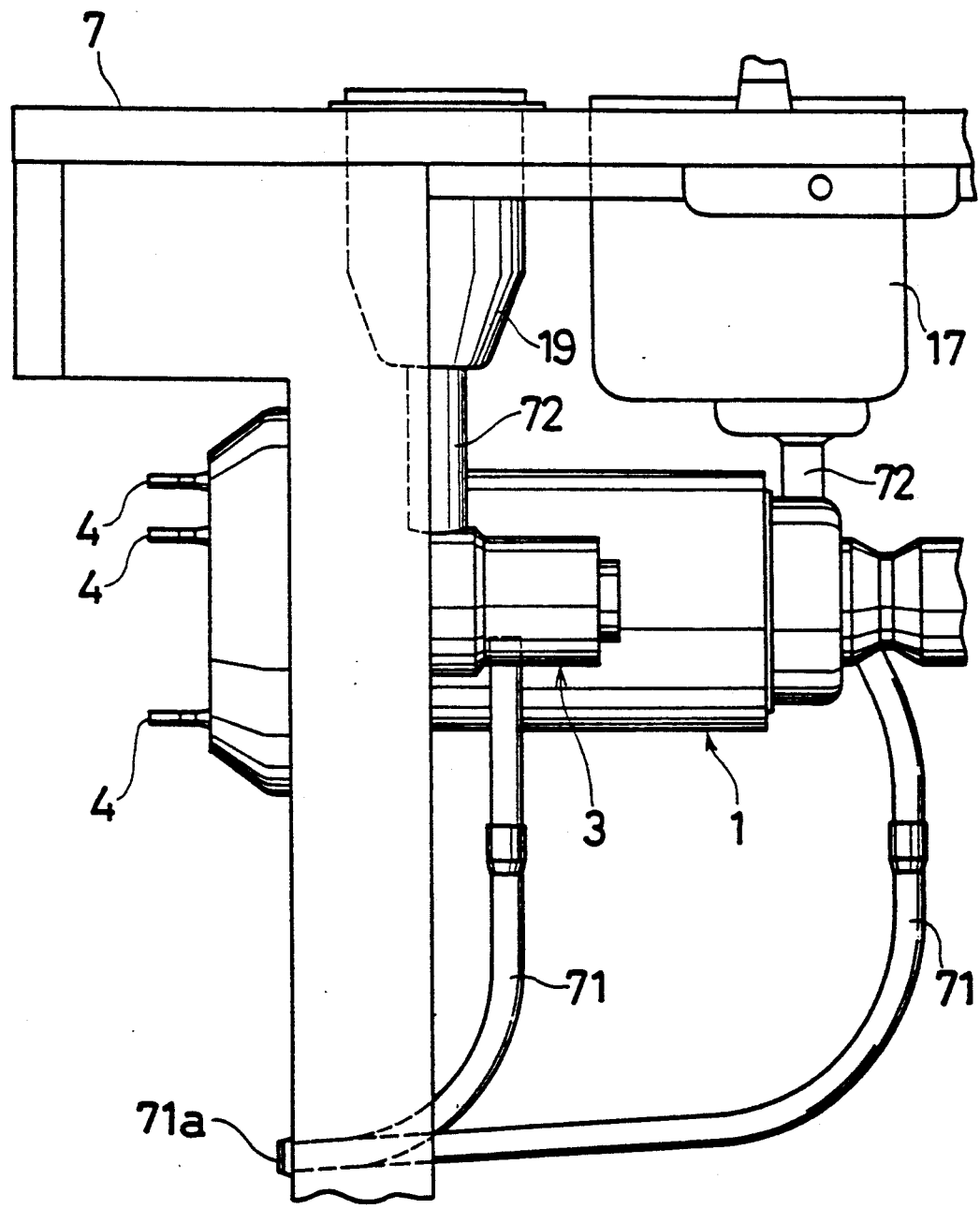
FIG. 9(b) is a side elevation illustrating essential parts of the apparatus for preparing a semi-frozen confection having a side panel removed for better illustration.

As shown in FIGS. 9(a) and (b), drain pipes 71 are respectively connected to each of the cylinder 1, the first cylinder 2 and second cylinder 3. The respective outlets 71a of the drain pipes 71 are placed above the draining board 12 mentioned earlier (refer to FIGS. 3(a) to (c)). The cylinder 1 and the comestible tank 17, the first cylinder 2 and the syrup tank 18, and the second cylinder 3 and the syrup tank 19 are respectively connected by means of connecting pipes 72.

Refrigeration System

Figure 10:
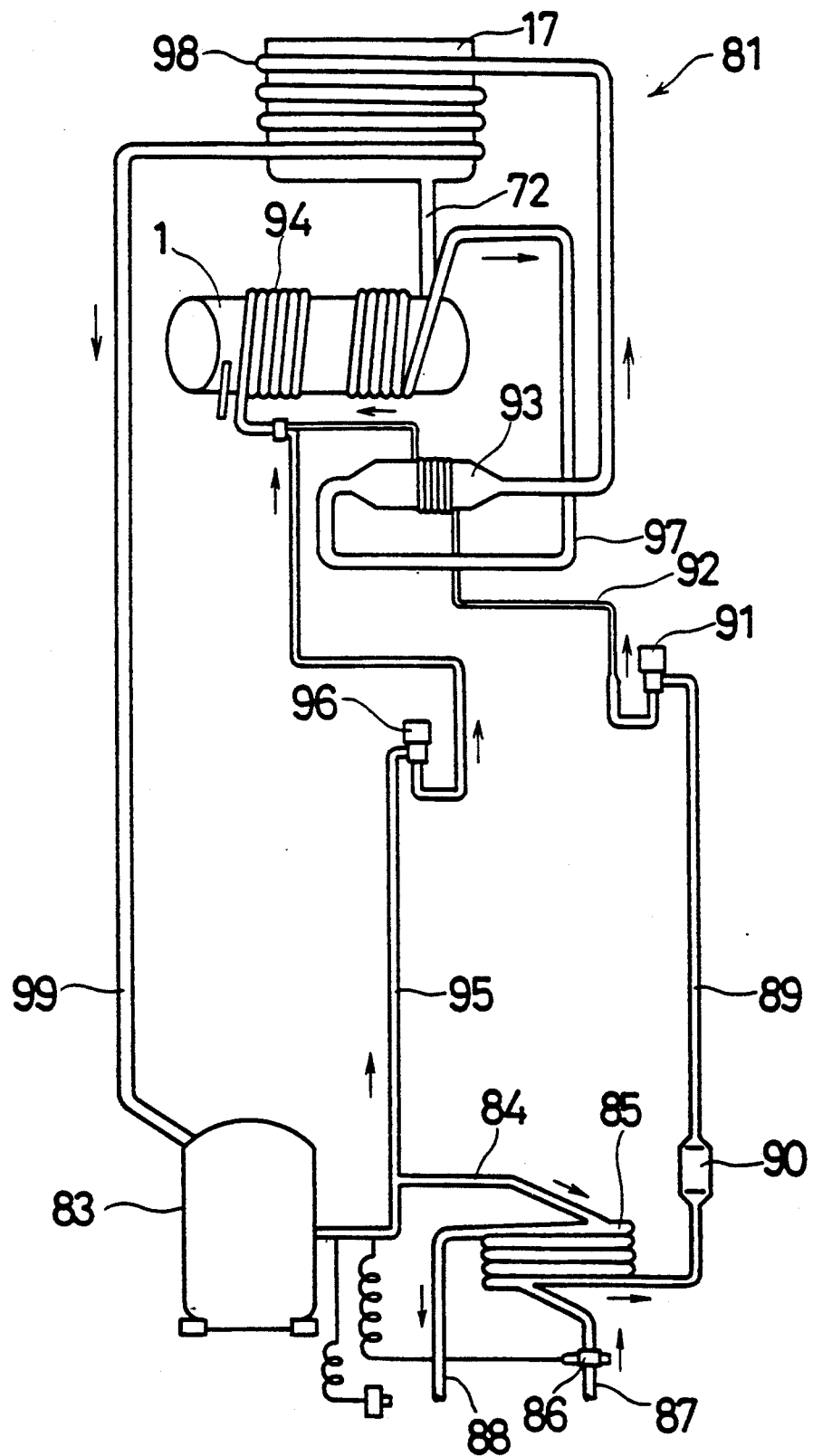
Figure 11:
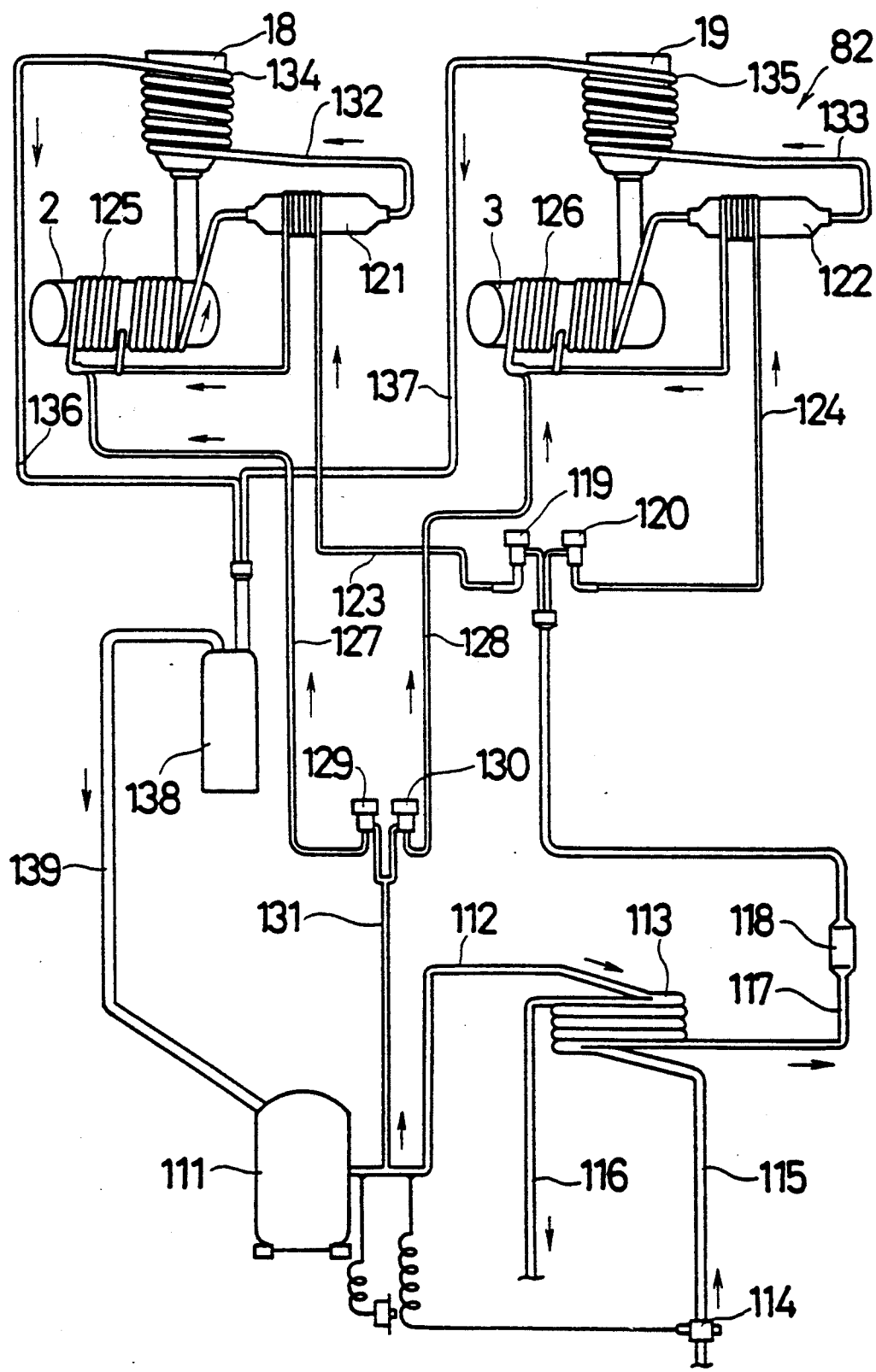
Figure 12:
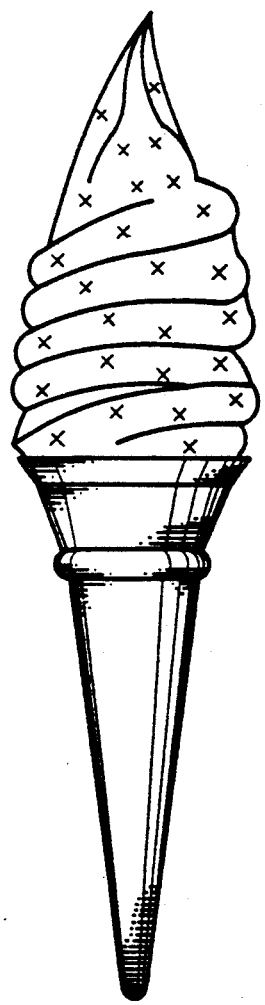

The present apparatus for preparing a semi-frozen confection comprises a refrigeration system 81, shown in FIG. 10, that refrigerates the cylinder 1 where the ice cream is prepared, as well as a refrigeration system 82, shown in FIG. 11, that refrigerates the first and second cylinders 2 and 3 where the syrups are stored. The refrigeration system 81 includes a compressor 83 whose exhausting outlet is connected by means of piping 84 to the inlet of a condenser 85 cooled by, for example, water. Water is supplied to the condenser 85 through a supply pipe 87 provided with a water supply regulator valve 86 and drained through a waste pipe 88 to cool and liquefy a refrigerant of a high temperature and high pressure. The outlet of the condenser 85 is connected to an expansion mechanism, e.g., a capillary tube 92, through a dewatering and filtering device 90, piping 89, and a solenoid valve 91 (the dewatering and filtering device 90 is used to remove the water and impurities contained in the refrigerant). The capillary tube 92 is wound around a heat exchanger 93. The outlet of the capillary tube 92 communicates with the inlet of an evaporator 94 disposed on the outer circumference of the cylinder 1. The outlet of the evaporator 94 is connected with the pumping side of the compressor 83 through piping 97, the heat exchanger 93, a refrigerating coil 98 disposed on the outer circumference of the comestible tank 17, and piping 99. The inlet of the evaporator 94 communicates with the exhausting outlet of the compressor 83 through piping 95 that is provided with a solenoid valve 96, to form a hot gas heating system.

The refrigeration system 82 comprises a compressor 111 whose exhausting outlet is connected by means of piping 112 with a condenser 113 cooled by, for example, water. Like in the above system 81, the condenser 113 is equipped with a supply pipe 115 provided with a water supply regulator valve 114, and a waste pipe 116. The outlet of the condenser 113 is connected through piping 117 with a dewatering and filtering device 118 that bifurcates toward the first cylinder 2 and the second cylinder 3. Such an arrangement enables to control the respective refrigeration of the cylinders 2 and 3 in accordance with the type of syrup stored therein. One of the outlets of the dewatering and filtering device 118 is connected through a solenoid valve 119 to a capillary tube 123 wound around a heat exchanger 121 located on the first cylinder 2 side. Meanwhile, the other outlet of the dewatering and filtering device 118 is connected through a solenoid valve 120 to a capillary tube 124 wound around a heat exchanger 122 located on the second cylinder 3 side. The refrigeration systems respectively extending from the capillary tube 123 and the capillary tube 124 to the compressor 111, have similar configurations. For simplification sake, the members composing the refrigeration system of the second cylinder 3 will thus be written in parentheses. Namely, the outlet of the capillary tube 123 (124) communicates with the inlet of an accumulator 138 through an evaporator 125 (126) disposed on the first cylinder 2 (second cylinder 3), the heat exchanger 121 (122), piping 132 (133), a refrigerating coil 134 (135) disposed on the syrup tank 18 (19), and piping 136 (137). The accumulator 138 permits to collect the liquefied refrigerant that was not reduced into gas and to prevent it from returning to the compressor 111. The outlet of the accumulator 138 is connected to the pumping side of the compressor 111 through piping 139. The inlet of the evaporator 125 (126) communicates through piping 127 (128) provided with a solenoid valve 129 (130), with piping 131 connected to the exhausting outlet of the compressor 111, to form a hot gas heating system.

Example of Control Means

Figure 14:
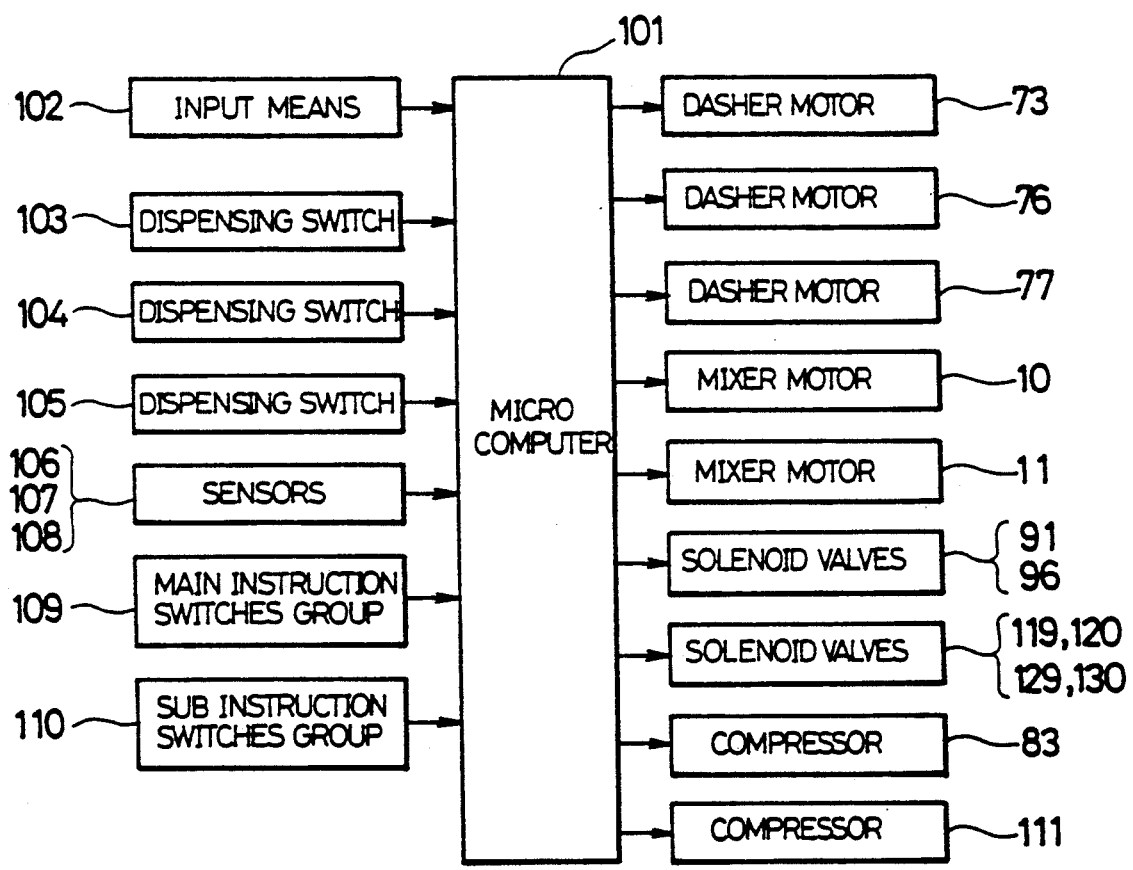

The present apparatus for preparing a semi-frozen confection may be designed such as to be supervised and controlled through a microcomputer 101 shown in FIG. 14 and serving as control means. Provision is made such that various signals released by input means 102, dispensing switches 103 to 105, sensors 106 to 108, main instruction switches group 109, and sub instruction switches group 110, to be described later, are fed into the microcomputer 101. For instance, the respective rotating speeds of the dasher motor 76 located on the first cylinder 2 side and of the dasher motor 77 located on the second cylinder 3 side, are set through the input means 102. The dispensing switches 103 to 105 are designed to turn ON/OFF in response to manipulations of the input means 102 as well as to manipulations of the pedals 14 to 16. The sensors 106 to 108 detect the current at which the dasher motors 73, 76 and 77 are driven, the temperature of the ice cream contained in the cylinder 1, the temperature of the syrups contained in the first and second cylinders 2 and 3, etc. The main instruction switches group 109 and sub instruction switches group 108 are respectively composed of a start-up switch, shutdown switch, heat switch, washing switch, and other switches.

The microcomputer 101 controls, as will be discussed later, the operations of the dasher motors 73, 76 and 77, the mixer motors 10 and 11, the solenoid valves 91, 96, 119, 120, 129, 130, the compressors 83 and 111, and other members, in response to the various signals fed thereto. In particular, provision is made such that, when the ice cream is delivered by the dasher 53, and the syrup delivered by the dasher 74 or 75, the microcomputer 101 controls the rotating speeds of the dasher motors 76 and 77 by controlling the voltage fed thereto in accordance to the values set through the input means 102. Accordingly, the present apparatus for preparing a semi-frozen confection enables to adjust the ratio of the rotating speeds of the dasher motor 73 of the ice cream cylinder 1, and the dasher motors 76 and 77 of the first and second syrup cylinders 2 and 3. This characteristic is an important feature of the present invention and permits to adjust the proportion of ice cream and syrup composing the semi-frozen confection to be served in a cone. Also, the input means 102 may be constituted by a variable resistor. In such a case, the control performed by the microcomputer 101 is executed in response to the variation of the resistance value of the variable resistor.

Operation of the Ice Cream Refrigeration System and Heating System

First, the operations executed when preparing the ice cream with the above arrangement will be discussed.

When the startup switch belonging to the main instruction switches group 109 is turned ON, the microcomputer 101 controls the dasher motor 73 to turn ON, and in the refrigeration system 81, the solenoid valve 91 to turn ON, i.e., to open, and the solenoid valve 96 to turn OFF, i.e. to close simultaneously. The compressor 83 further turns ON two seconds later. As a result, a refrigeration system composed of the compressor 83→the condenser 85→the capillary tube 92→the evaporator 94→the compressor 83, is formed.

In this situation, the gaseous refrigerant is compressed to an elevated pressure in the compressor 83, liquefied in the condenser 85, and the pressure thereof is reduced in the capillary tube 92 after the water and impurities contained therein were removed in the dewatering and filtering device 90. The low pressured refrigerant takes the evaporation heat to evaporate in the evaporator 94 from the cylinder 1, thereby enabling the cylinder 1 to be refrigerated. The resulting moist gas that was not totally vaporized, is employed for the refrigeration by the heat exchanger 93 of the refrigerant contained in the capillary tube 92, and the refrigeration by the refrigerating coil 98 of the comestible tank 17. This enables the comestible used for preparing the ice cream and supplied from the comestible tank 17 to the cylinder 1, to be refrigerated to, for example, $-5°$ to $-8°$ C. while being stirred. Then, as the comestible turns into ice cream, the hardness thereof increases thereby increasing the load imposed on the dasher motor 73. When the sensor 106 for instance, detected that the driving current of the dasher motor 73 reached the predetermined value, the compressor 83 and solenoid valve 91 are switched OFF due to the control executed by the microcomputer 101, causing the dasher motor 73 to stop three seconds later.

After the preparation of the ice cream is completed, the ice cream remaining in the cylinder 1 is collected and the interior of the cylinder 1 is washed. The following sequence of operations is therefore executed in order to actuate the heating system mentioned earlier:

(1) an operator switches the heat switch belonging to the main instruction switches group 109 ON;

(2) Computer 101 executes a control such that the compressor 83 is turned ON, the solenoid valve 91 is turned OFF to be closed and the solenoid valve 96 is turned ON to be opened;

(3) the dasher motor 73 turns ON thirty seconds later;

(4) the refrigerant that was changed into a gas of high pressure and high temperature in the compressor 83, is consequently sent through the piping 95 and the solenoid valve 96 to the evaporator 94 enabling the heat exchange to take place in the cylinder 1;

(5) the refrigerant is further sent through the piping 97 to the refrigerating coil 98 enabling the heat exchange to take place in the comestible tank 17; and (6) the refrigerant is then sent back to the compressor 83.

The operation of the heating system as described by the above steps (1) to (6), causes the ice cream contained in the cylinder 1 to be heated and to melt, and the comestible tank 17 to be heated. In this situation, wash water is supplied from the water supply device 20 to the comestible tank 17 where it is heated. After the predetermined time needed for the heating operation executed by the heating system has elapsed, the operator switches the wash switch belonging to the main instruction switches group 109 ON. The microcomputer 101 executes a control such that the dasher motor 73 and the solenoid valve 91 are turned ON while the solenoid valve 96 is turned OFF. The cylinder 1 is efficiently washed as the dasher 53 driven by the dasher motor 73 stirs the heated water contained therein.

Operation of the Syrup Refrigeration System and Heating System

When preparing the semi-frozen confection made of ice cream and syrup, the refrigeration system 81 is operated as was described above, and in addition the other refrigeration system 82 is actuated. (The configuration of the refrigeration system 82 is anagolous on the cylinder 2 side and on the cylinder 3 side. For sake of simplicity, the code of the members belonging to the cylinder 3 side will be indicated in parentheses). In order to actuate the refrigeration system 82, the operator switches the startup switch of the sub instruction switches group 110 ON. Consequently, in response to the control performed by the microcomputer 101, the dasher motor 76 (77) and the solenoid valve 119 (120) are turned ON while the solenoid valve 129 (130) is turned OFF, and the compressor 111 turns ON two seconds later (while the refrigeration system 82 is operating, the dasher motor 76 (77) is rotated at low speed so as not to damage the fruit pulp or the like contained in the syrup). As a result, a refrigeration system composed of the compressor 111→the condenser 113→the capillary tube 123 (124)→the evaporator 125 (126)→the compressor 111, is formed.

After being compressed to a high pressure and high temperature in the compressor 111, the refrigerant is condensed in the condenser 113, passes through the dewatering and filtering device 118 and the pressure thereof is reduced in the capillary tube 123 (124). The low pressured refrigerant takes the evaporation heat to evaporate in the evaporator 125 (126) from the first cylinder 2 (second cylinder 3), thereby enabling the first cylinder 2 (second cylinder 3) to be refrigerated. The resulting moist gas that was not totally vaporized, is employed for the refrigeration by the heat exchanger 121 (122) of the liquefied refrigerant contained in the capillary tube 123 (124), and the refrigeration by the refrigerating coil 134 (135) of the syrup tank 18 (19). This enables the syrup to be supplied from the syrup tank 18 (19) to the first cylinder 2 (second cylinder 3), to be refrigerated to for example $-4°$ to $-7°$ C. The liquefied refrigerant that was not vaporized is collected in the accumulator 138 and only the refrigerant that was vaporized is sent back to the compressor 111.

Then, when the sensor 107 (106) detects that, for example the temperature of the syrup reached the desired value, the compressor 111 and the solenoid valve 119 (120) are turned OFF and the dasher motor 76 (77) stops three seconds later in response to the control executed by the microcomputer 101. The syrup stored in the cylinder 2 and the syrup stored in the cylinder 3 are of different types and therefore usually have different cooling rates. If, for example, the temperature of the syrup stored in the cylinder 2 reaches the desired value rapidly, the microcomputer 101 turns only the solenoid valve 119 OFF enabling the refrigeration of the cylinder 2 to be stopped.

After the cooling operation of the syrup is completed, the syrup remaining in the first cylinder 2 (second cylinder 3) is collected and the interior of the first cylinder 2 (second cylinder 3) is washed. When, for this purpose, the operator switches the heat switch of the sub instruction switches group 110 ON, the compressor 111 and the solenoid valve 129 (130) are turned ON, the solenoid valve 119 (120) turned OFF and the dasher motor 76 (77) is turned ON thirty seconds later in response to the control executed by the microcomputer 101. The opening of the solenoid valve 129 (130) actuates the heating system mentioned earlier. Namely, the refrigerant that was changed to a high pressure and high temperature gas in the compressor 111, passes through the pipings 131 and 127 (128) and is sent into the evaporator 125 (126). As a result, a heat exchange takes place between the refrigerant and the first cylinder 2 (second cylinder 3) thereby permitting the first cylinder 2 (second cylinder 3) to be heated. In addition, a heat exchange takes place between the refrigerant and the syrup tank 18 through the refrigerant coil 134 (135) thereby permitting the syrup tank 18 (19) to be heated. The refrigerant is then sent back through the accumulator 138 to the compressor 111.

After the predetermined time needed for the heating operation executed by the heating system has elapsed, the operator switches the wash switch belonging to the sub instruction switches group 110 ON. The microcomputer 101 consequently executes a control such that the dasher motor 76 (77) and the solenoid valve 119 (120) are turned ON while the solenoid valve 129 (130) is turned OFF. In this situation, wash water supplied to the first cylinder 2 (second cylinder 3) from the water supply device 20, is heated to wash the interior of the syrup tank 18 (19) and the first cylinder 2 (second cylinder 3). Here, washing is efficiently performed through the operation of the dasher 74 (75) driven by the dasher motor 76 (77).

Preparation of the Semi-Frozen Confection

In order to prepare the semi-frozen confection, the comestible, i.e., the ingredient of the ice cream, is placed into the comestible tank 17 while, for example, syrups containing fruit pulp of different flavors are respectively placed into the syrup tanks 18 and 19. The comestible contained in the comestible tank 17 is delivered through the connecting pipe 72 (see FIG. 9(b)) to the cylinder 1 where it is refrigerated while being stirred by means of the dasher 53. Similarly, the syrups contained in the syrup tanks 18 and 19 are delivered through different connecting pipes 72 to the first and second cylinders 2 and 3 where they are refrigerated while being stirred by means of the dashers 74 and 75. Here, the refrigerating temperature of the ice cream contained in the cylinder 1 is set to −5° to −8° C., as mentioned earlier, while the refrigerating temperature of the syrups contained in the first and second cylinder 2 and 3 is set to −4° to −7° C. In addition, the dasher motors 76 and 77 are controlled to rotate at low speed through the microcomputer 101 so as not to crush the fruit pulp contained in the syrups.

A case where, after the syrups were refrigerated to the desired temperature and the ice cream was prepared, a semi-frozen confection composed exclusively of ice cream is dispensed from the present apparatus to be served in a cone, will be discussed hereinbelow. When the operator depresses the pedal 15, the center plunger 33 (see FIG. 6) is lifted through the wire cable thereby enabling the first ice cream passageway 26 (see FIG. 1(a)) to communicate with the through hole 23. In addition, depressing the pedal 15 causes the dispensing switch 104 to turn ON in an interlocked fashion, whereby the microcomputer 101 turns the dasher motor 73 ON. This enables the ice cream contained in cylinder 1 to be delivered into the through hole 23 while being stirred by the dasher 53. The ice cream is then dispensed through a shaping outlet 25 disposed at the lower end of the through hole 23, to be served in, for example, a cone.

Figure 13:
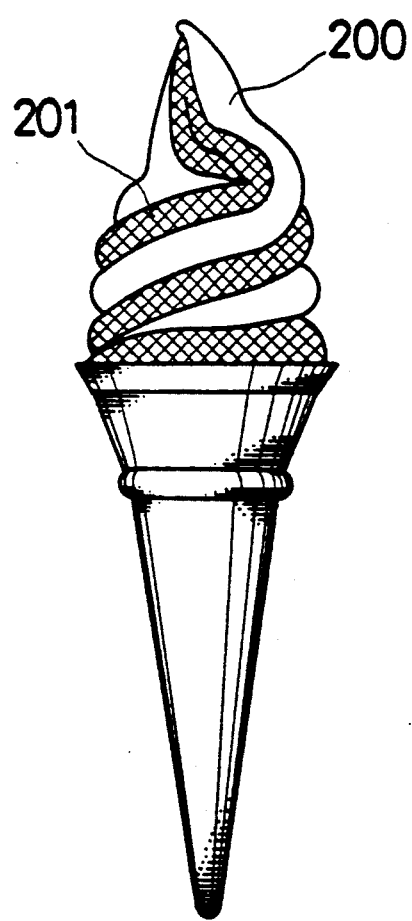

In order to dispense a semi-frozen confection made of the ice cream and, e.g., the syrup stored in the syrup tank 18, the operator depresses the pedal 14. This causes the side plunger 34 of the through hole 22 to be lifted up thereby enabling the through hole 22 to communicate with the second ice cream passageway 27 and the first syrup passageway 29 (see FIG. 5). Depressing the pedal 14 causes the dispensing switch 103 to switch ON in an interlocked fashion, whereby the dasher motors 73 and 76 are turned ON in response to the control executed by the microcomputer 101. The ice cream contained in the cylinder 1 and the syrup contained in the first cylinder 2 are respectively delivered through the second ice cream passageway 27 and the first syrup passageway 29 to the mixing chamber 48 of the through hole 22 while being respectively stirred by the dashers 53 and 74. Here, the dasher motor 76 is controlled so as to rotate at a faster speed than when the syrup is merely refrigerated, in order to ensure a fast and accurate delivery of the syrup. In addition, the rotating speed of the dasher motor 76 may be set by the operator through the input means 102. The microcomputer 101 therefore controls the rotating speed of the dasher motor 76 in response to the above setting. The amount of syrup that is supplied varies according to the rotating speed of the dasher 74. The proportion of ice cream and syrup contained in the semi-frozen confection to be served may thus be changed as desired through the above setting. At this time, if the mixer motor 11 (see FIG. 4(b)) that drives the mixer 47 mounted in the mixing chamber 48, was set to rotate, the mixer motor 11 turns ON as the dispensing switch 103 is turned ON, thereby causing the mixer 47 to rotate. As a result, the ice cream and the syrup are stirred in the mixing chamber 48 to dispense a blended semi-frozen confection through the shaping outlet 25 disposed at the lower end of the through hole 22. The resulting dispensed semi-frozen confection is served in a cone, as for example illustrated in FIG. 12. If, on the other hand, the mixer 47 was not set to rotate, the semi-frozen confection dispensed is composed of two spiral layers, i.e., a layer of ice cream 200 and a layer of syrup 201, as illustrated in FIG. 13. As mentioned above, the syrup is refrigerated at a low temperature, namely −4° to −7° C. whereby it does not cause the temperature of the ice cream to rise. The semi-frozen confection prepared as described above is thus capable of retaining a suitable shape when served in a cone.

A semi-frozen confection composed of the syrup stored in the syrup tank 19 and the ice cream may be prepared through a similar process by depressing the pedal 16.

As described above, the first and second syrup cylinders 2 and 3 are installed in close proximity to the ice cream cylinder 1 as well as to the semi-frozen confection dispensing conduits, i.e., the through holes 22 and 24. The mechanism for delivering the syrups contained in the first and second cylinders 2 and 3 by means of the dashers 74 and 75 thus eliminates the need for the complex mechanism adopted in conventional apparatuses comprising a long connecting tube extending from the syrup tank to the semi-frozen confection dispensing conduit, a solenoid valve affixed to the connecting tube and regulating the delivery, a device for delivering the syrup from the syrup tank through gas pressure or the like, etc. As a result, the configuration of the apparatus for preparing a semi-frozen confection may be simplified and thereby its cost may be reduced, and the path for delivering the syrup may be kept in a hygienic condition easily.

Second Embodiment

Another embodiment of the present invention will be discussed hereinbelow with reference to FIGS. 15 to 19. For convenience sake, the members shown in the figures of the aforementioned embodiment and having the same function will be designated by the same code and their description will be omitted.

Figure 17:
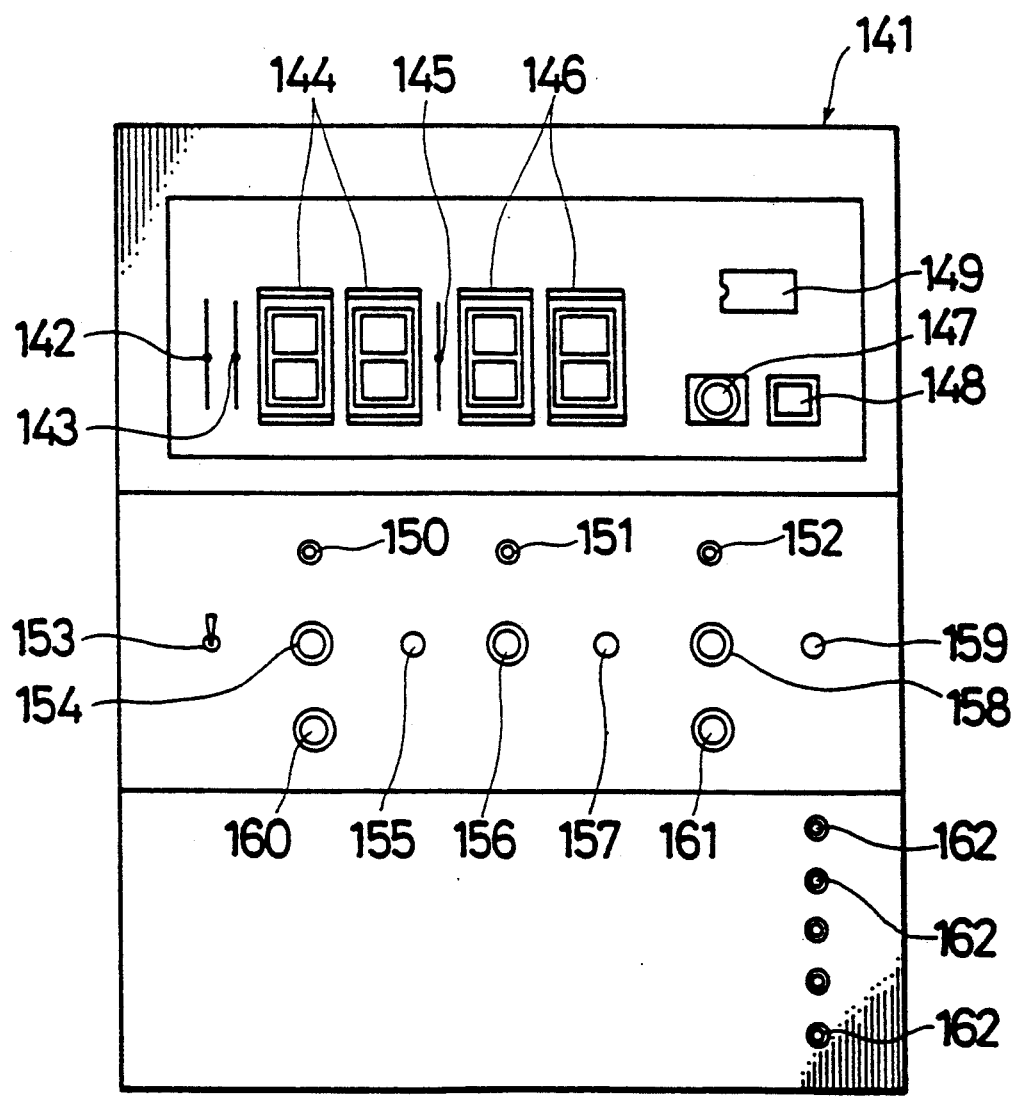

The apparatus for preparing a semi-frozen confection of the present embodiment has a configuration similar to the apparatus described in the first embodiment and in addition comprises a control unit 141 shown in FIG. 17. Here, the present apparatus for preparing a semi-frozen confection comprises a CPU 171 and peripheral devices thereof illustrated in FIG. 15(b) and to be described later, instead of the microcomputer 101 and the peripheral devices thereof that were described with reference to FIG. 14.

Configuration of the Display Section

Figure 2B:
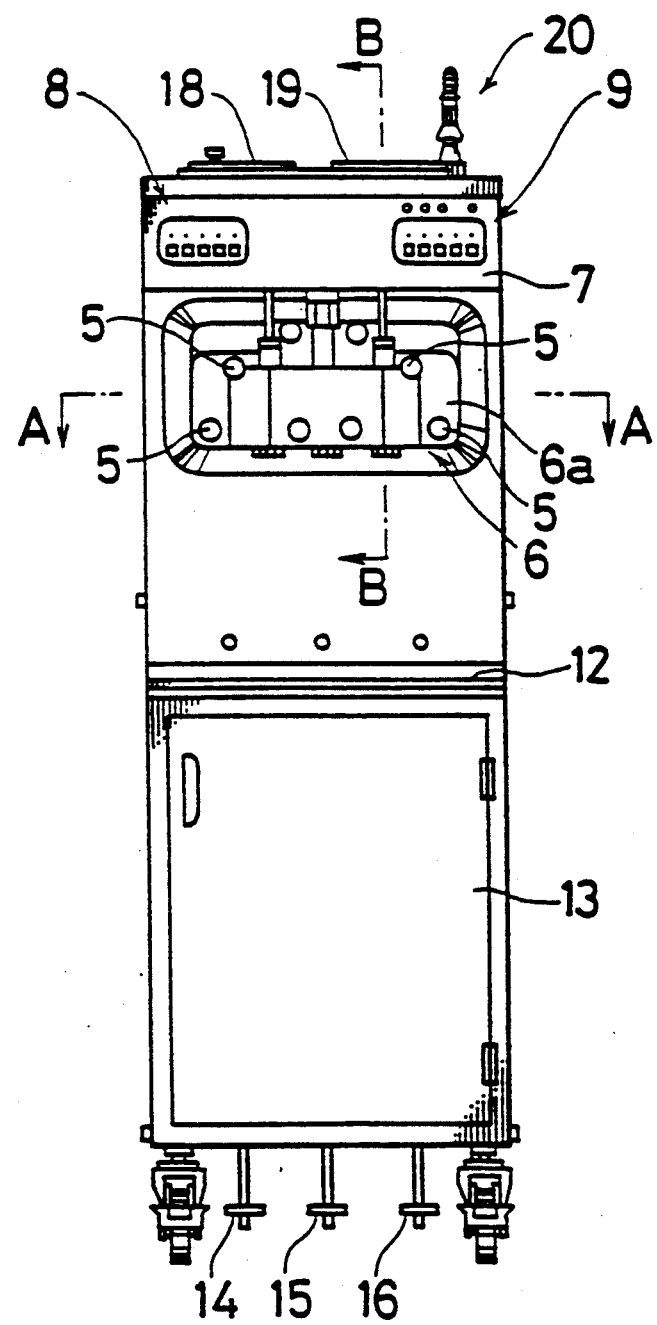
FIG. 2(b) is a front elevation of the above apparatus for preparing a semi-frozen confection.
Figure 2C:
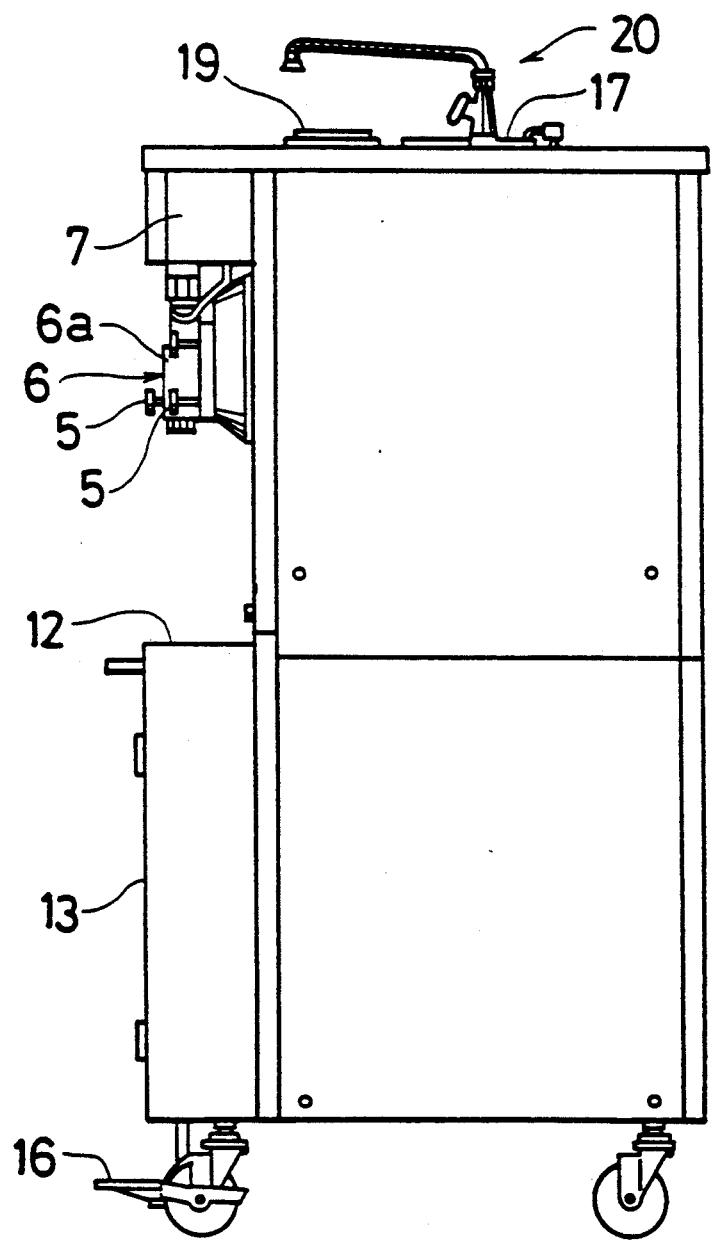
FIG. 2(c) is a side elevation of the above apparatus for preparing a semi-frozen confection.
Figure 18:
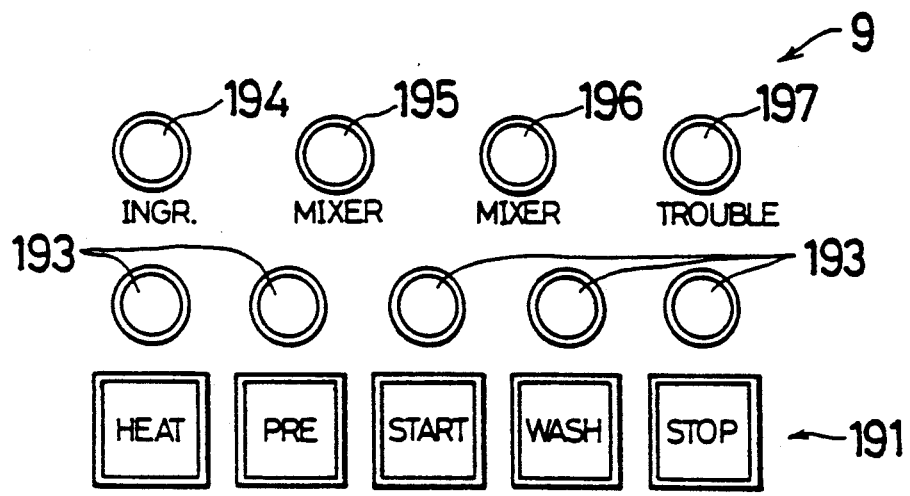

As shown in FIG. 18, a display section 9 (see FIG. 2(b)) located on the upper front section of the apparatus for preparing a semi-frozen confection, comprises a main instruction switches group 191. The main instruction switches group 191 is composed of switches respectively permitting to select one of the different operations executed in a cylinder 1 side (e.g., heating, pre-refrigeration, startup, washing and shutdown). A LED (light emitting diode) 193 is provided for each switch, and indicates, when lit, that the corresponding switch thereof is ON. There are further provided a LED 194 for indicating that the ingredients have to be replenished, a LED 195 and a LED 196 for respectively indicating that the mixer motors 10 and 11 are rotating, and a LED 197 for indicating that an abnormality has occurred.

Figure 19:
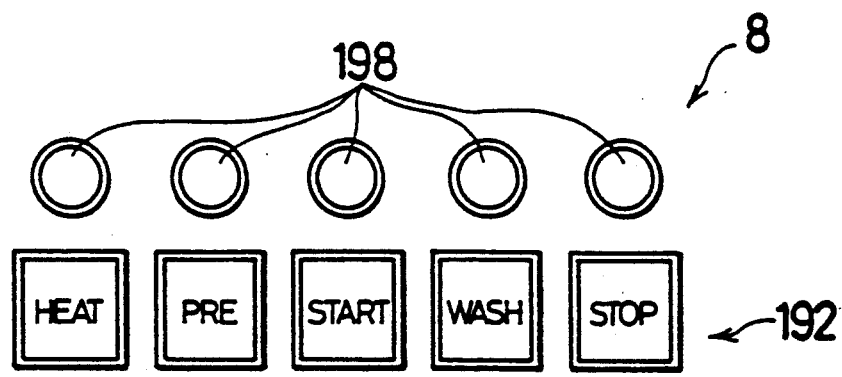

As shown in FIG. 19, another display section 8 located on the upper front section of the apparatus for preparing a semi-frozen confection, comprises a sub instruction switches group 192. The sub instruction switches group 192 is composed of switches respectively permitting to select one of the different operations executed in first and second cylinder 2 and 3 side (e.g., heating, pre-refrigeration, startup, washing and shutdown). A LED 198 is provided for each switch, and indicates, when lit, that the corresponding switch thereof is ON.

Configuration of the Control Unit

As illustrated in FIG. 17, the wall of the control unit 141 is divided into an upper level, a mid level and a lower level. Each level is provided with various display lamps, a manipulation section, switches, etc. The mid level forms the section where the operator dispensing the semi-frozen confection can adjust the preparation conditions as required (hereinafter, this adjustment will be referred to as customer's adjustment).

First the configuration of the upper level will be discussed, from the left side thereof on. When lit, a LED 142 indicates that the operation of the cylinder 1 is controlled based on the driving current of the dasher motor 73. When it is unlit, the LED 142 indicates that the above control is executed based on the temperature detected by a thermistor 178, to be described later. When lit, a LED 143 indicates that a numerical value displayed on a measured numerical value display section 144, to be described later, is positive. When it is unlit, the LED 143 indicates that the above numerical value is negative. The measured numerical value display section 144 is composed of a LED and is capable of displaying measured numerical values of two figures. When lit, a LED 145 indicates that a numerical value displayed on a set numerical value display section 146 to be described later, is positive. When it is unlit, the LED 145 indicates that the above numerical value is negative. The set numerical value display section 146 serves as means for displaying set numerical values, is composed of a LED and is capable of displaying set numerical values of two figures. Namely, the reference values that were set for the preparation conditions, are displayed on the set numerical value display section 146. In addition, there are provided a numerical value setting variable resistor 147 serving as reference value input means, a program selection switch 148 serving as program selection input means and an EPROM (erasable programmable read only memory) 149, serving as memory means. (Hereinafter, the term variable resistor will be denoted by VR). In the EPROM 149 are stored a plurality of programs employed for controlling the various preparation conditions. One program is set for each preparation condition. The numerical value setting VR 147 is one of the essential means of the present invention and is employed for setting the reference value for each program selected through the program selection switch 148. The operation consisting of setting the reference values by means of the numerical value setting VR 147, is for example performed before shipping the apparatus for preparing a semi-frozen confection out from the plant.

Next, the configuration of the mid level of the control unit 141 will be described from the upper section of left side thereof on. A LED 150 lights as a first syrup temperature setting switch 155 to be described later is switched ON. Similarly, a LED 151 lights as a temperature/current setting switch 157 to be described later is switched ON, and a LED 152 lights as a second syrup temperature setting switch 159 is switched ON (the above switches 155, 157 and 159 belong to specific program selection input means). A power switch 153 is used for switching ON/OFF the power of a main control board and a sub control board composing the control circuit installed within the control unit 141, as well as for clearing the reset of the sub control board. Provision is made such that by switching the first syrup temperature setting switch 155 ON during the operation mode for preparing a semi-frozen confection, the temperature of syrup contained in the first cylinder 2 may be set through a first syrup temperature setting VR 154. Similarly, the temperature of the comestible contained in the cylinder 1, or the driving current of a dasher motor 73 located in the cylinder 1 side may be set through a temperature/current setting VR 156 by switching the temperature/current setting switch 157 ON. Also, by switching the second syrup temperature setting switch 159 ON, the temperature of the syrup contained in the second cylinder 3 may be set through a second syrup temperature setting VR 158. Dasher speed setting VRs 160 and 161 are respectively used for setting the rotating speed of the syrup dashers 74 and 75 rotating at high speed when dispensing the semi-frozen confection. The proportion of the ice cream and syrup composing the semi-frozen confection may be selected as required according to the viscosity or type of syrup and ice cream, or according to one's taste, through the operation of the dasher speed setting VRs 160 and 161 (VRs 154, 156, 158, 160 and 161 belong to input means for reference value updating). In addition, provision is made such that when the first syrup temperature setting switch 155 or the second syrup temperature setting switch 159 is switched ON, the temperature of the cylinder 2 or 3 is displayed on the measured numerical value display section 144. Similarly, when the temperature/current setting switch 157 is switched ON, the temperature of the comestible contained in the cylinder 1 or the value of the driving current of the dasher motor 73 used for the cylinder 1, is displayed on the measured numerical value display section 144.

A plurality of LEDs 162 disposed in the lower level of the control unit 141 notify the location of a trouble such as an abnormal stop caused by the overload of the dasher motor 73, 76 or 77, the overload of the compressor 83 or 111 of the refrigeration system 81 or 82, etc.

Figure 15A:
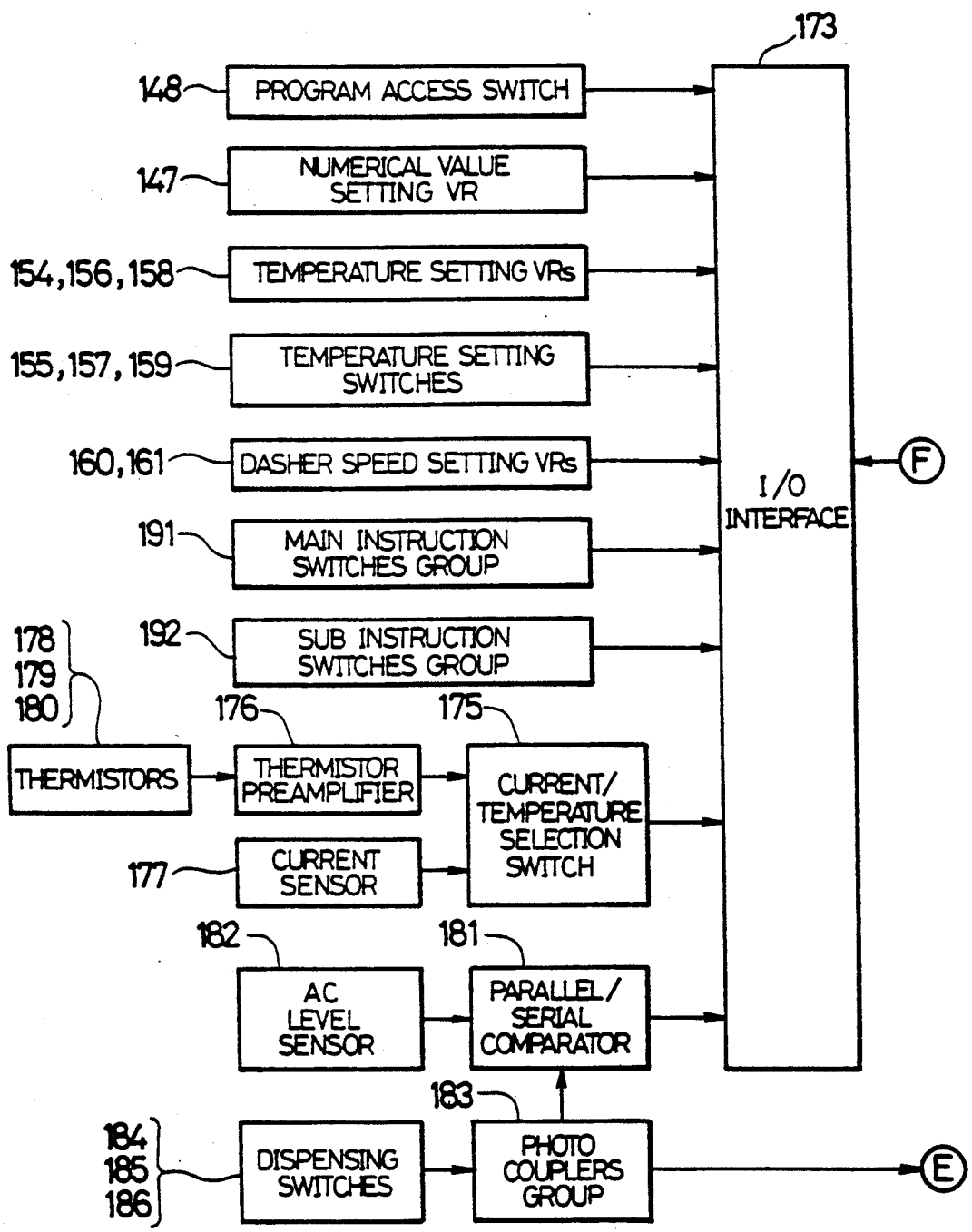
FIGS. 15(a) and (b) are block diagrams illustrating the configuration of the control circuit of an apparatus for preparing a semi-frozen confection.
Figure 15B:
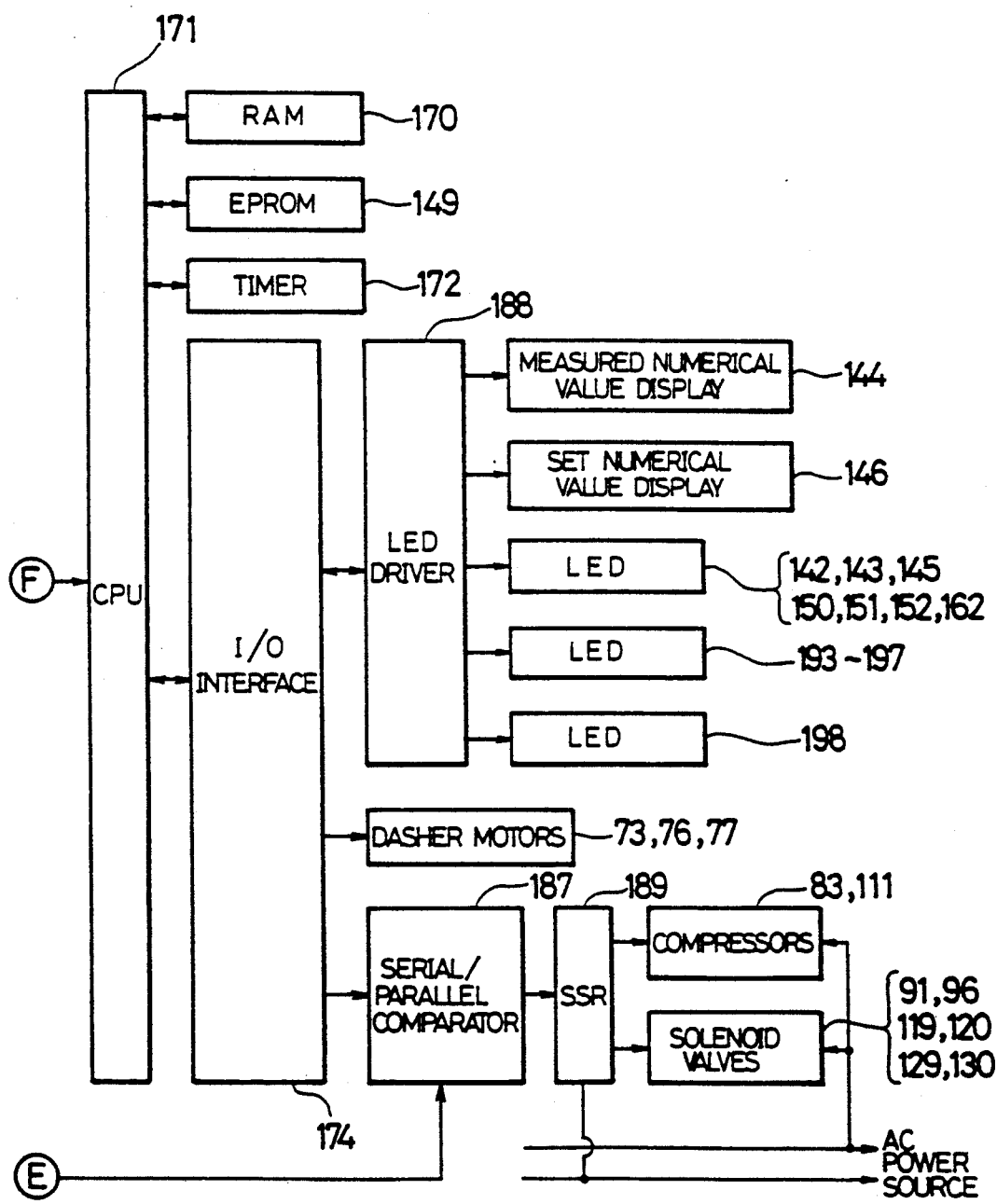
FIG. 15 to FIG. 19 illustrate another embodiment of the present invention.

The present apparatus for preparing a semi-frozen confection is designed such that the control unit 141 comprises a control device shown in FIGS. 15(a) and (b). This control device is composed of the CPU (central processing unit) 171 serving as control means, a RAM (random access memory) 170, a timer 172, the EPROM 149, input/output interfaces (hereinafter referred to as I/O interfaces) 173 and 174, a parallel/serial comparator 181, a photo couplers group 183, a LED driver 188, a serial/parallel comparator 187, a solid state relay (SSR) 189 and other members. Provision is made such that the control device controls various means, to be described later, connected to the I/O interface 174, in response to the input signals sent from various means, to be covered later, connected to the I/O interface 173.

To the I/O interface 173 are connected the program selection switch 148, numerical value setting VR 147, first syrup temperature setting VR 154, temperature/current setting VR 156, second syrup temperature setting VR 158, first and second syrup temperature setting switches 155 and 159, temperature/current setting switch 157, dasher speed setting VRs 160 and 161, main instruction switches group 191 and sub instruction switches group 192. In addition, a current/temperature selection switch 175 that is mounted on a board inside the control unit 141, and the parallel/serial comparator 181, are connected to the I/O interface 173. To the current/temperature selection switch 175 are connected a thermistor preamplifier 176 and a current sensor 177 that detects the value of the driving current for the dasher motor 73 of the cylinder 1 side. The thermistor preamplifier 176 is connected to the thermistor 178 that detects the temperature of the comestible contained in the cylinder 1, and to thermistors 179 and 180 that respectively detect the temperature of the syrups contained in the first and second cylinder 2 and 3. To the parallel/serial comparator 181 are connected an AC level sensor 182 and the output side of the photo couplers group 183. Dispensing switches 184 to 186 are connected to the input side of the photo couplers group 183. The dispensing switches 184 to 186 are switched ON/OFF as the pedals 14 to 16 are depressed/released (the dispensing switches 184 and 186 belong to the specific program selection input means). The output side of the photo couplers group 183 is also connected to the serial/parallel comparator 187. The AC level sensor 182 detects the level of the comestible and syrups respectively contained in the comestible tank 17 and the syrup tanks 18 and 19. Namely, the AC level sensor 182 passes an alternating current through the comestible and syrups, and detects the remaining amount of liquid through the value of the current, or in other words, the resistance value. As a result, when the level of liquid is insufficient, it can be notified by means of a LED (for instance the LED 194). Here, a DC level sensor can not be implemented instead of the AC level sensor 182. Namely, with a DC level sensor, an electrolysis occurs due to the water contained in the comestible or syrups. This causes, for example, an insoluble matter made of lactic acid to adhere to the +pole of the sensor whereby the electrical conductivity lowers and an accurate detection can not be executed.

Meanwhile, to the I/O interface 174 there are connected the LED driver 188 that drives the above LEDs, the dasher motors 73, 76 and 77, and the serial/parallel comparator 187. The measured numerical value display section 144, the set numerical value display section 146, the group of LEDs 142, 143, 145, 150, 151, 152 and 162, the group of LEDs 193 to 197 and the group of LEDs 198, that were described earlier with reference to FIGS. 17 to 19, are respectively connected to the LED driver 188. The compressors 83 and 111, and the solenoid valves 91, 96, 119, 120, 129 and 130 are connected through the solid state relay 189 to the output side of the serial/parallel comparator 187.

Control Programs

Control programs No. 1 to No. 99 for controlling the various means corresponding to the various preparation conditions of the semi-frozen confection, are stored in the EPROM 149. In the operation mode, the CPU 171 controls the various means connected to the I/O interface 174 in response to the input signals released by the switches or other members connected to the I/O interface 173 based on the different programs and the reference value set for each of the programs. During the adjustment mode that enables to set an optimum reference value for each program, the control operations are executed by the CPU 171 as illustrated by the flow charts shown in FIGS. 16(a) and (b). The control operations executed by the CPU 171 in the operation mode and in the adjustment mode will be discussed afterwards.

Now, several program numbers, the contents of the corresponding control, the specific numerical value set as reference for the control, and the specific VR adopted for setting this numerical value, will be cited as examples. Here, there are inscribed in order the program number/(1) the VR operated/(2) the contents of the control/(3) the numerical value set.

No.1/(1) numerical value setting VR 147 or temperature/current setting VR 156/(2) stop of the operating compressor 83 in accordance with the reference driving current for the dasher motor 73 or the reference temperature for the cylinder 1/(3) generally 4.3A or −5.3° C.

No. 2/(1) numerical value setting VR 147/(2) start or stop of the cylinder 1 in accordance with the reference amount of variation in the temperature inside the cylinder 1/(3) 0.1° to 1.0° C. (generally 0.5° C.) (for instance, if the temperature inside the cylinder 1 rises from −5° C. to 4.5° C., the cylinder 1 is started up. This program enables the ice cream contained in the cylinder 1 to be maintained at a prescribed temperature.).

No. 5/(1) numerical value setting VR 147/(2) OFF time of the cylinder 1 (i.e., the permissible time for the cylinder 1 to stay in a stopped state until forcibly returned to the operating state)/(3) 1 to 30 minutes, generally 7 minutes.

No.9/(1) numerical value setting VR 147/(2) selection of the control factor of the cylinder 1/(3) 1 or 0 (if set to 1, the control factor will be the temperature of the cylinder 1, if set to 0, the control factor will be the driving current of the dasher motor 73).

No. 21/(1) numerical value setting VR 147 or first syrup temperature setting VR 154/(2) temperature of the first cylinder 2/(3) +13° C. to −9.9° C., generally set to −6.0° C.

No.22/(1) numerical value setting VR 147/(2) start or stop of the first cylinder 2 in accordance with the reference amount of variation in the temperature inside the first cylinder 2/(3) 0.1° to 1.0° C., generally 0.5° C. (this program enables the syrup contained in the first cylinder 2 to be maintained at a prescribed temperature).

No. 26/(1) numerical value setting VR 147/(2) control of the voltage to drive the dasher motor 76 of the first cylinder 2 at a low speed/(3) 0 to 5.0 V, generally 2 V.

No. 27/(1) numerical value setting VR 147 or dasher speed setting VR 160/(2) control of the voltage to drive the dasher motor 76 of the first cylinder 2 at a high speed/(3) 0 to 5.0 V, generally 4 V.

No. 31/(1) numerical value setting VR 147 or second syrup temperature setting VR 158/(2) temperature of the second cylinder 3/(3) +13° C. to −9.9° C., generally −6° C.

No. 32/(1) numerical value setting VR 147/(2) start or stop of the second cylinder 3 in accordance with the reference amount of variation in the temperature inside the second cylinder 3/(3) 0.1° to 1.0° C., generally 0.5° C. (this program enables the syrup contained in the second cylinder 3 to be maintained at a prescribed temperature).

No. 36/(1) numerical value setting VR 147/(2) control of the voltage to drive the dasher motor 77 of the second cylinder 3 at a low speed/(3) 0 to 5.0 V, generally 2 V.

No. 37/(1) numerical value setting VR 147 or dasher speed setting VR 161/(2) control of the voltage to drive the dasher motor 77 of the second cylinder 3 at a high speed/(3) 0 to 5.0 V, generally 4 V.

No. 90/(1) numerical value setting VR 147/(2) frequency of the power source/(3) 50 Hz or 60 Hz.

No. 91/(1) numerical value setting VR 147/(2) calibration of the temperature of the comestible contained in the cylinder 1/(3) measured temperature of a sample of comestible.

No. 93/(1) numerical value setting VR 147/(2) calibration of the temperature of the syrup contained in the first cylinder 2/(3) measured temperature of a sample of syrup.

No. 95/(1) numerical value setting VR 147/(2) calibration of the temperature of the syrup contained in the second cylinder 3/(3) measured temperature of sample of syrup.

As described above, with the present apparatus for preparing a semi-frozen confection, the preparation conditions may be pre-adjusted by setting the reference value of each program through the operation of the sole numerical value setting VR 147 in the adjustment mode. In addition, the reference value of each of the programs adopted for executing customer's adjustments such as programs Nos. 1, 21, 27, 31, 37, etc. may be adjusted during the operation mode by means of the VRs 154, 156, 158, 160 and 161 of the mid level shown in FIG. 17, without having to stop the operation of the apparatus and shift to the adjustment mode. This permits to simplify the system for adjusting the preparation conditions and to reduce the size thereof, as well as to simplify the adjustment operations. The overall operational efficiency of the apparatus may thus be improved.

Control Operation

Figure 16A:
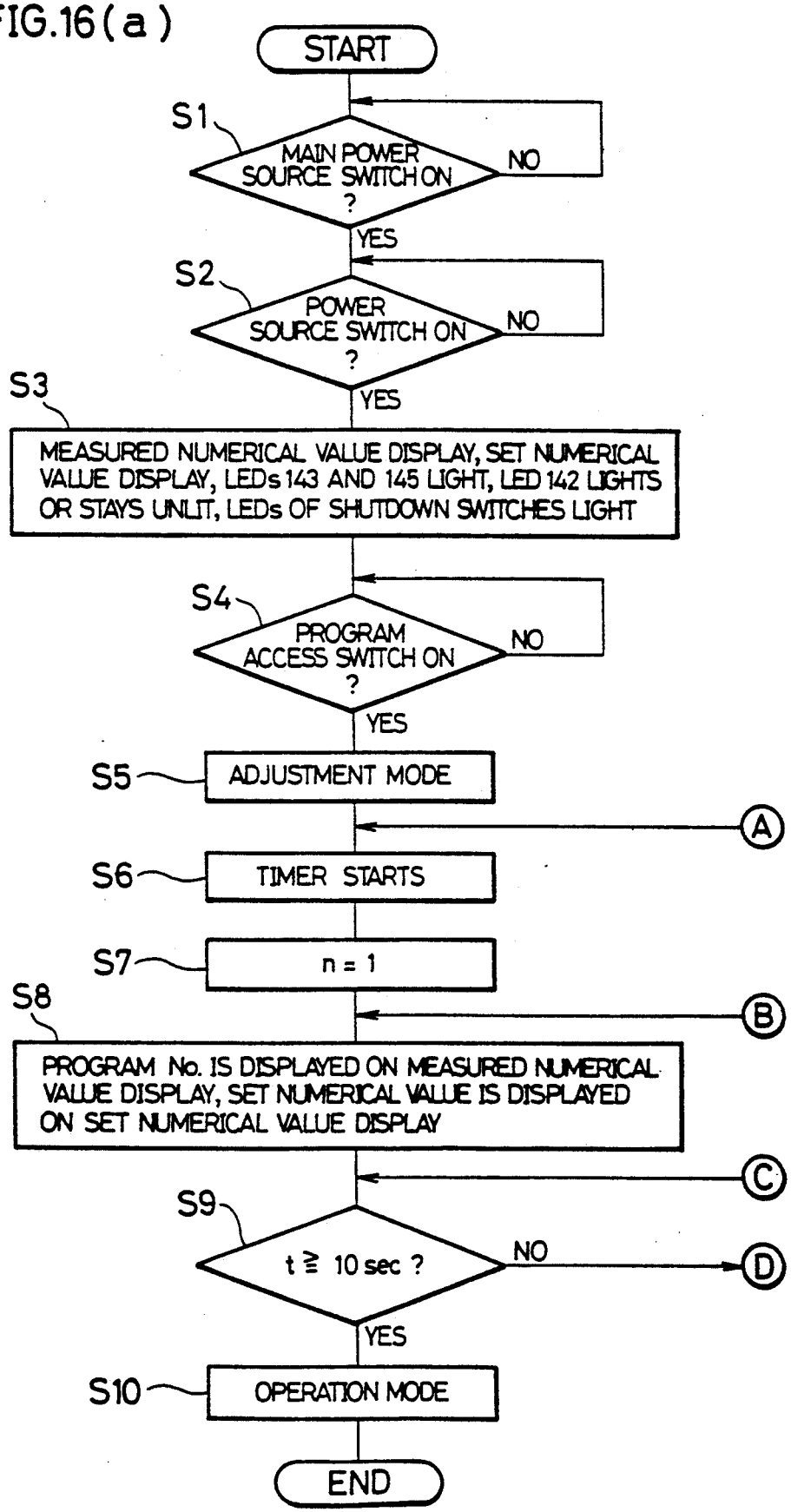
Figure 16B:
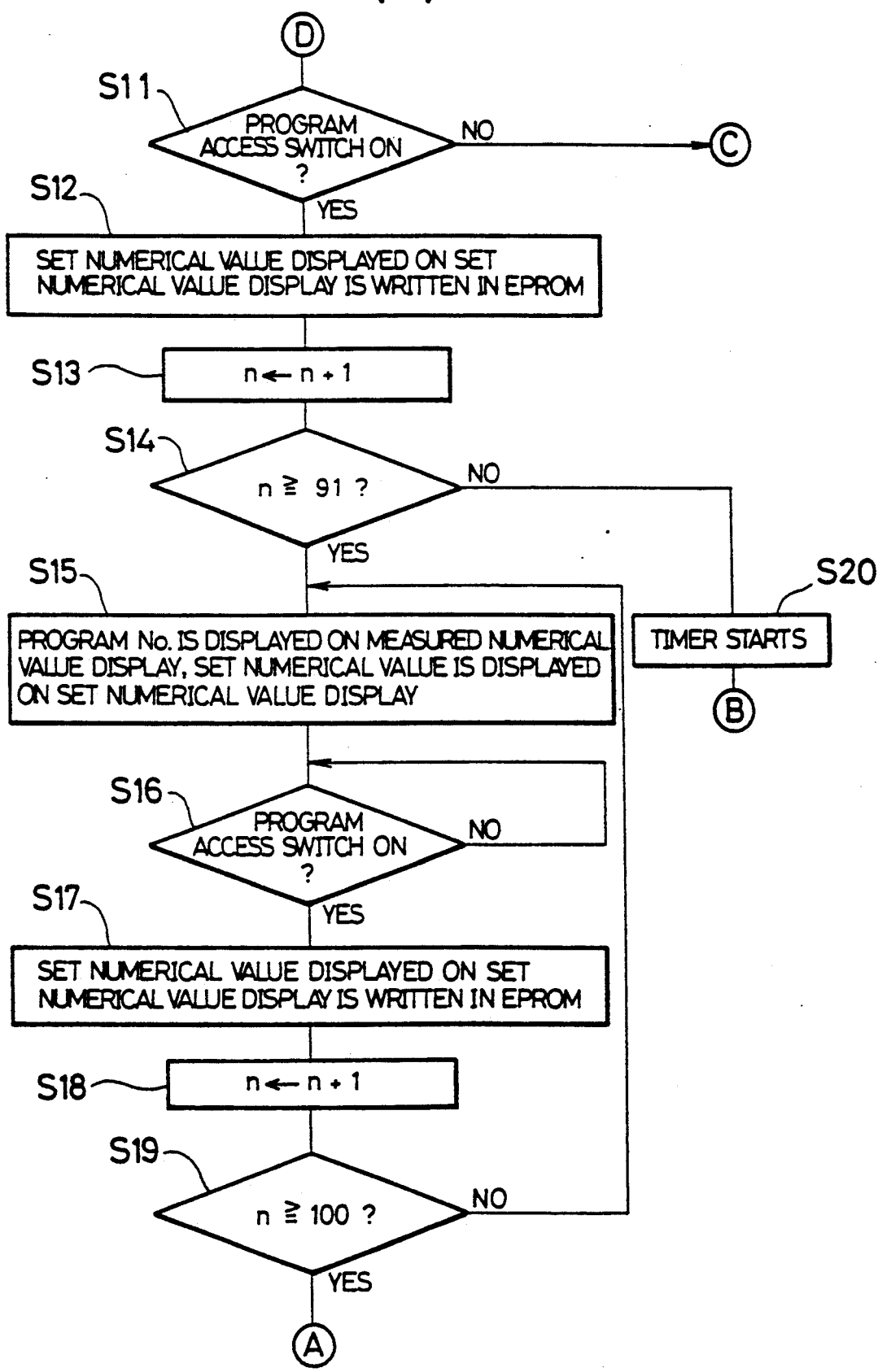

With the above arrangement, the control operation executed by the CPU 171 to set the reference value of each program in the adjustment mode, will be discussed with reference to the flow charts shown in FIGS. 16(a) and (b).

First, after having checked the connections between the various boards installed in the control unit 141, a coordinator performing the preliminary adjustments of the preparation conditions, switches a main power source switch, not shown, ON (Step 1; hereinafter Step will be denoted by S), and switches the power source switch 153 of the control unit 141 ON (S2). In S3, the measured numerical value display section 144, set numerical value display section 146 consequently light up, as well as the LEDs 143 and 145, indicating that positive values are displayed. The LED 142 lights up if, in program No. 9, the current/temperature selection switch 175 is switched to the current measurement mode and the control through the driving current of the dasher motor 73 is selected. The LED 142 stays unlit if the control through the temperature of the cylinder 1 is selected. In addition, the LED 193 and the LED 198 that respectively indicate that the shutdown switches belonging to the main instruction switches group 191 (see FIG. 18) and to the sub instruction switches group 192 (see FIG. 19) are ON, light up. The above processes all belong to S3.

The coordinator then switches the program selection switch 148 ON (S4), causing the control mode of the CPU 171 to be shifted to the adjustment mode (S5), the timer 172 to start measuring the time t (S6), and the counter to be set to 1 (S7). Here, the numerical value set at the counter corresponds to the number of the program being selected. In this case, the program No. 1 is selected from the programs stored in the EPROM 149. Numeral 01 is consequently displayed on the measured numerical value display section 144 while the reference value to be set for the program No. 1 is displayed on the set numerical value display section 146 in response to the manipulation of the numerical value setting VR 147 executed by the coordinator (S8). The coordinator is thus able to see the numerical value displayed on the set numerical value display section 146 while setting the reference value.

Thereafter, provision is made such that if the coordinator does not press the program selection switch 148 before the time t reaches 10 seconds (S9), the numerical value displayed on the set numerical value display section 146 is not written in the EPROM 149 and the control mode of the CPU 171 is automatically shifted to the operation mode (S10).

If, on the other hand, the coordinator presses the program selection switch 148 (S11) before the time t reaches 10 seconds, the numerical value displayed on the set numerical value display section 146 is written in the EPROM 149 to serve as reference value for the control contents of the program (i.e., program No.1)

(S12), and the counter is incremented by 1 (S13). It is then determined whether the value n counted by the counter reached 91 (S14). If the value n did not reach 91, the timer 172 starts measuring the time t (S20) and the process is shifted to S8. In S8, the program whose number corresponds to the value n set at the counter is selected. The program number thereof is consequently displayed on the measured numerical value display section 144 while a numerical value is displayed on the set numerical value display section 146 in response to the manipulation of the numerical value setting VR 147 performed by the coordinator. The above operation is repeated thereafter until the value n counted by the counter reaches 91 in S14.

During the setting operation of the numerical values of the programs 91 to 99, to be described hereinbelow, the control permitting to shift to the operation mode in response to the time t, is not performed. This is due to the fact that setting the reference values for, e.g., the programs Nos. 91, 93 and 95 used for calibrating the temperature cited earlier, is executed while measuring the temperature and is thus time consuming. When in S14, the value n counted by the counter reached 91, the program No. 91 is selected from the programs stored in the EPROM 149, in the same way as in S8. Numeral 91 is consequently displayed on the measured numerical value display section 144 while the reference value to be set for the program No. 91 is displayed on the set numerical value display section 146 in response to the manipulation of the numerical value setting VR 147 (S15). Thereafter, when the coordinator presses the program selection switch 148 (S16), the reference value for the program No. 91 displayed on the setting numerical value display section 146 is written in the EPROM 149 (S17) and the counter is incremented by 1 (S18). S15 to S18 are repeated until the value counted by the counter reaches 100. When the counted value n reaches 100 (S19), the operation is shifted to S6 and follows the subsequent steps. With the present apparatus, the values serving as reference for the control contents of the programs No. 1 to No. 99 are set as described above.

To return to the adjustment mode after the control of the CPU 171 was shifted to the operation mode, the operator preparing the semi-frozen confection should switch the shutdown switches of the main instruction switches group 191 and of the sub instruction switches group 192 ON to stop the operation of the apparatus, and switch the program selection switch 148 ON thereafter. However, as was mentioned earlier, the temperature of the syrups contained in the first and second cylinders 2 and 3, the temperature of the comestible contained in the cylinder 1 and the value of the driving current of the dasher motor 73 located on the cylinder 1 side, may be adjusted while the control executed by the CPU 171 is in the operation mode. For this purpose, the operator should switch ON, e.g., the first syrup temperature setting switch 155, the second syrup temperature setting switch 159 or the temperature/current setting switch 157 disposed in the mid level section of the control unit 141. This causes the program No. 21, No. 31 or No.1 to be selected and the corresponding program number to be displayed on the measured numerical value display section 144. To adjust the reference value of the selected program, the operator should manipulate the first syrup temperature setting VR 154, the second syrup temperature setting VR 158, or the temperature/current setting VR 156 employed for the customer's adjustments, while looking at the numerical value displayed on the set numerical value display section 146. Such an arrangement enables the customer's adjustments to be readily performed.

Now, when, in order to prepare an ice cream in the operation mode, the operator switches ON the startup switch belonging to the main instruction switches group 191, the CPU 171 executes a control such that the dasher motor 73 actuates, and in the refrigeration system 81, the solenoid valve 91 turns ON and opens, the solenoid valve 96 turns OFF and closes, and the compressor 83 actuates two seconds later. A refrigeration system constituted of the compressor 83→condenser 85→capillary tube 92→evaporator 94→compressor 83 is thus formed. This refrigeration system operates as was discussed in the first embodiment.

When, after being refrigerated while being stirred, the comestible contained in the cylinder 1 hardens to form the ice cream, the load imposed on the dasher motor 73 increases causing the driving current of the dasher motor 73 to increase. Suppose now that in program 9 the control factor of the cylinder 1 is set to the driving current of the dasher motor 73. When it was detected through the current sensor 177 that the current driving the dasher motor 73 reached the prescribed value, the compressor 83 and the solenoid valve 91 are turned OFF, and the dasher motor 73 stops three seconds later according to the control executed by the CPU 171 based on the program No. 1. If, in program No. 9, the control factor of the cylinder 1 is set to the temperature detected by means of the thermistor 178, the CPU 171 executes a control similar to that discussed above when it is detected through the thermistor 178 that the temperature reached the prescribed value.

After the preparation of the ice cream was completed and the ice cream was collected, the operator switches ON the heat switch belonging to the main instruction switches group 191 to wash the cylinder 1. The CPU 171 consequently executes a control enabling the compressor 83 to be switched ON, the solenoid valve 91 to be switched OFF, the solenoid valve 94 to be switched ON and the dasher motor 73 to turn ON thirty seconds later. The heating system is thus actuated. After heating was performed by the heating system for a prescribed period and was completed, the dasher motor 73 is turned ON, the solenoid valve 91 is switched ON and the solenoid valve 96 is switched OFF in response to the control executed by the CPU 171 as the operator switches ON the wash switch belonging to the main instruction switches group 191. The interior of the comestible tank 17 and the interior of the cylinder 1 are washed by means of the wash water supplied from the water supply device 20 to the comestible tank 17, as discussed earlier.

In order to refrigerate the syrups, the operator switches ON the startup switch belonging to the sub instruction switches group 192. The dasher motors 76 and 77 are consequently controlled by the CPU 171 to rotate at low speed based on the programs No. 26 and No. 36. In addition, according to the control executed by the CPU 171, in the refrigeration system 82, the solenoid valves 119 and 120 are switched ON, the solenoid valves 129 and 130 are switched OFF, and the compressor 111 is switched ON two seconds later. A syrup refrigeration system constituted by the compressor 111→condenser 113→capillary tubes 123 and 124→evaporators 125 and 126→compressor 111, is thus formed. This refrigeration system operates as was discussed earlier.

Thereafter, when it is detected through the thermistors 179 and 180 that the temperature of each of the syrups reached the predetermined value thereof, the compressor 111 and the solenoid valves 119 and 120 are switched OFF and the dasher motors 76 and 77 stop three seconds later due to the control executed by the CPU 171 based on the programs No. 21 and No. 31.

After the refrigeration of the syrups was completed and the syrups were collected, the operator switches ON the heat switch belonging to the sub instruction switches group 192 to wash the interiors of the first and second cylinders 2 and 3. Consequently, the CPU 171 executes a control such that the compressor 111 turns ON, the solenoid valves 129 and 130 are switched ON, the solenoid valves 119 and 120 are switched OFF and the dasher motors 76 and 77 actuate thirty seconds later. After heating was performed for the prescribed time by the heating system formed as described above and was completed, the operator switches ON the wash switch belonging to the sub instruction switches group 192. This causes the dasher motors 76 and 77 to be switched ON, the solenoid valves 119 and 120 to be switched ON and the solenoid valves 129 and 130 to be switched OFF, and allows washing to take place.

In order to dispense and serve in a cone a semi-frozen confection exclusively composed of ice cream from the present apparatus, the operator depresses the pedal 15 thereby causing the dispensing switch 185 to be switched ON. If the dasher motor 73 is OFF, it is consequently switched ON according to the control executed by the CPU 171.

In order to dispense and serve in a cone a semi-frozen confection composed of the syrup stored in the syrup tank 18 and ice cream, the operator depresses the pedal 14 thereby causing the dispensing switch 184 to be switched ON. The dasher motors 73 and 76 are consequently switched ON according to the control executed by the CPU 171. The dasher motor 76 is driven to rotate at high speed based on the program No. 27. Since the program No. 27 is running, the rotating speed of the dasher motor 76 may be controlled by the CPU 171 in accordance with the value set by the operator through the dasher speed VR 160 without need to shift to the adjustment mode. As a result, as the amount of syrup supplied varies according to the above set value, semi-frozen confections of varied proportions of ice cream and syrup may be readily prepared. Furthermore, if at this time the mixer motor 11 is set to rotate as mentioned earlier, the mixer motor 11 is switched ON as the operator switches the dispensing switch 184 thereby causing the mixer 47 to rotate. In such a case, the ice cream and syrup are stirred in the mixing chamber 48 to produce a blended semi-frozen confection. On the other hand, if the mixer motor 11 is not set to rotate, the semi-frozen confection dispensed is composed of two spiral layers of ice cream and syrup.

When dispensing and serving in a cone a semi-frozen confection composed of the syrup stored in the syrup tank 19 and ice cream, the operator depresses the pedal 16 thereby causing the dispensing switch 186 to be switched ON and the semi-frozen confection is dispensed through operations analogous to those discussed above. Here, the running program is program No. 37 and the rotating speed of the dasher motor 77 may be changed through the dasher speed setting VR 161.

In the second embodiment, the various VRs adopted were analog variable resistors. However, digital setting devices or D/A converters may be adopted instead.

With the arrangements adopted in the first and second embodiments, the syrups contained in the first and second cylinders 2 and 3 were delivered by means of the dashers 74 and 75. However, these are not restrictive examples, and the syrups may instead be extruded by means of, for example, gas pressure or air pressure, or by means of a mechanical system consisting in moving an extruding plate installed inside the cylinder through the operation of a manual lever.

With the arrangements adopted in the first and second embodiments, the proportion of the ice cream and syrup composing the semi-frozen confection was regulated by controlling the rotating speed of the dasher motors 76 and 77 respectively located on the first and second cylinders 2 and 3 sides through the microcomputer 101 or the CPU 171. However, these are not restrictive examples and the microcomputer 101 or the CPU 171 may, for example, control the rotating speed of the dasher motor 73 installed on the ice cream cylinder 1 side, or the rotating speed of the three dasher motors 73, 76 and 77.

Ice cream to be served in a cone constituted the main ingredient of the semi-frozen confection of the first and second embodiments but ice cream of a greater hardness, milk shake, etc. may as well be employed.

As described above, the apparatus for preparing a semi-frozen confection of the present invention is designed such that each cylinder for refrigerating syrup is installed in close proximity to both the cylinder for freezing the main ingredient of the semi-frozen confection and the semi-frozen confection dispensing conduit. Such an arrangement enables to shorten the delivery path extending from each cylinder for refrigerating syrup to the semi-frozen confection dispensing conduit. Any syrup may thus be delivered even if refrigerated at a temperature below 0° C. thereby enabling the semi-frozen confection to be suitably prepared and to retain its shape.

Furthermore, the apparatus for preparing a semi-frozen confection in accordance with the present invention comprises first drive means for delivering ice cream to a semi-frozen confection dispensing conduit, second drive means for delivering syrup, and control means for controlling the rotating speed of at least one of the first and second drive means. This arrangement enables to change as desired the proportion of the main ingredient and the syrup composing the semi-frozen confection.

Furthermore, the apparatus for preparing a semi-frozen confection in accordance with the present invention is arranged such that the programs controlling the different means to be controlled, may be selected through the program selection input means, and the reference value of the selected program may be set through the manipulation of reference value input means. Such an arrangement enables the reference value of the contents of each control to be set easily, or in other words, the preparation conditions of the apparatus for preparing a semi-frozen confection to be adjusted easily. In addition, the size of the device for inputting the reference values may be reduced whereby the size of the apparatus for preparing a semi-frozen confection itself may be reduced as well.

The invention being thus described, it will be obvious that the same may be varied in many ways. Such variations are not to be regarded as a departure from the scope of the invention.

There are described above novel features which the skilled man will appreciate give rise to advantages.

These are each independent aspects of the invention to be covered by the present application, irrespective of whether or not they are included within the scope of the following claims.

What is claimed is:

1. An apparatus for preparing a semi-frozen confection comprising:
    at least one semi-frozen confection dispensing conduit means provided with a semi-frozen confection dispensing outlet;
    freezing cylinder for a main ingredient of the semi-frozen confection connected to said semi-frozen confection dispensing conduit means, where raw materials composing the main ingredient are stirred and refrigerated to produce the main ingredient;
    a first mixer housed in said freezing cylinder and whose rotation axis coincides with the central axis of said freezing cylinder, for delivering the main ingredient of the semi-frozen confection to said semi-frozen confection dispensing conduit means;
    at least one syrup refrigerating cylinder connected to said semi-frozen confection dispensing conduit means and where syrup is stirred and refrigerated;
    a second mixer housed in said syrup refrigerating cylinder and whose rotation axis coincides to the central axis of said syrup refrigeration cylinder, for delivering the syrup to said semi-frozen confection dispensing conduit means;
    first drive means for driving said first mixer to rotate;
    second drive means for driving said second mixer to rotate;
    input means for setting the rotating speed ratio of said first mixer and said second mixer; and
    control means for controlling the rotating speed of at least one of said first drive means and said second drive means in accordance with the rotating speed ratio set through said input means,
    wherein said control means controls the rotating speed of at least one of said first drive means and said second drive means in accordance with the rotating speed ratio set through said input means to vary as desired the proportion of the main ingredient and the syrup that compose the semi-frozen confection when the semi-frozen confection is dispensed, and controls the rotating speed of said second drive means such that the rotating speed of said second mixer is higher when said second mixer sends the syrup to said semi-frozen confection dispensing conduit means than when said second mixer stirs the syrup being refrigerated in said syrup refrigerating cylinder.

2. An apparatus for preparing a semi-frozen confection comprising:
    at least one semi-frozen confection dispensing conduit means provided with a semi-frozen confection dispensing outlet;
    a freezing cylinder for a main ingredient of the semi-frozen confection connected to said semi-frozen confection dispensing conduit means, where raw materials of the main ingredient are stirred and refrigerated to produce the main ingredient;
    at least one syrup refrigerating cylinder mounted in the vicinity of both said semi-frozen confection dispensing conduit means and said freezing cylinder, capable of cooling the syrup below about 0° C. while being stirred;
    syrup delivering means attached to said syrup refrigerating cylinder for delivering the syrup to said semi-frozen confection dispensing conduit means via a second passageway for connecting said semi-frozen confection dispensing conduit and said syrup refrigerating cylinder, said second passageway being of a length that enables delivering of the syrup in a viscous condition;
    stirring means for stirring the main ingredient of the semi-frozen confection and the syrup delivered to said semi-frozen confection dispensing means;
    wherein a rise in the temperature of the main ingredient of the semi-frozen confection caused by the syrup is restrained to a minimum when preparing the semi-frozen confection composed of the main ingredient and the syrup.

3. An apparatus for preparing a semi-frozen confection according to claim 1 further comprising a refrigeration system that refrigerate said syrup refrigerating cylinder.

4. An apparatus for preparing a semi-frozen confection according to claim 2 further comprising a freezer door mounted at the front of said freezing cylinder and said syrup refrigerating cylinder, wherein a portion of said semi-frozen confection dispensing conduit means is located inside said freezer door.

5. An apparatus for preparing a semi-frozen confection according to claim 4 wherein said semi-frozen confection dispensing conduit means is installed in the vicinity of an intermediate position between the front of said freezing cylinder and the front of said syrup refrigerating cylinder, communicates with said freezing cylinder through a first passageway.

6. An apparatus for preparing a semi-frozen confection according to claim 5 wherein a plunger is fitted in said semi-frozen confection dispensing conduit means, said plunger vertically reciprocating in an interlocked fashion with the up and down movement of a pedal and when said plunger is lifted, outlets of said first and second passageways open simultaneously enabling delivery of the main ingredient of the semi-frozen confection from said freezing cylinder to said semi-frozen confection dispensing conduit means and enabling delivery of the syrup from the syrup refrigerating cylinder of said semi-frozen confection dispensing conduit means.

7. An apparatus for preparing a semi-frozen confection according to claim 5 wherein said first passageway communicates with said freezing cylinder through a by-pass, and enables the main ingredient of the semi-frozen confection remaining in said first passage-way to return to said freezing cylinder.

8. An apparatus for preparing a semi-frozen confection according to claim 2 further comprising a first mixer housed in said freezing cylinder having a rotation axis coinciding with the central axis of said freezing cylinder, said first mixer capable of delivering the main ingredient of the semi-frozen confection to said semi-frozen confection dispensing conduit means,
    wherein said syrup delivering means comprises a second mixer having a rotation axis coinciding with the central axis of said syrup refrigerating cylinder.

9. An apparatus for preparing a semi-frozen confection according to claim 8 further comprising:
    first drive means for providing rotation of said first mixer;
    second drive means for providing rotation of said second mixer;
    input means for setting the rotating speed ratio of said first mixer and said second mixer; and control means for controlling the rotating speed of at least one of said mixers in response to said input means, wherein said control means is capable of controlling the rotating speed of at least one of said drive means in accordance with the rotating speed ratio set through said input means to thereby vary the proportion of the mean ingredient and the syrup when the semi-frozen confection is being dispensed, and is capable of controlling the rotating speed of said second mixer and enables the rotating speed of said second mixer to be higher when said second mixer sends the syrup to said semi-frozen confection dispensing conduit means then when said second mixer stirs the syrup being refrigerated in said syrup refrigerating cylinder.

10. An apparatus for preparing a semi-frozen confection according to claim 2 further comprising:

controlled means actuating during the preparation of the semi-frozen confection and controlled in response to reference values set;

memory means for storing programs enabling control of said controlled means and said reference values set in said programs;

a program selection input means for selecting programs from said programs stored in said memory means in an adjustment mode that enables adjustment of the preparation conditions;

a reference value input means for setting said reference values in the programs selected through said program selection input means;

control means which enables access of programs stored in said memory means in response to an instruction from said program selection input means and enables setting numerical values in said programs in accordance with an operation of said reference value input means and enables storing as said reference value into said memory means wherein the last of said numerical values is entered by the operation of said reference value input means, and which, in an operation mode, enables the preparation of the semi-frozen confection and for controlling said controlled means based on the reference values stored in said memory means.

11. An apparatus for preparing a semi-frozen confection according to claim 10 further comprising:

a first mixer, housed in said freezing cylinder and having a rotation axis coinciding with the central axis of said freezing cylinder, for delivering the main ingredient of the semi-frozen confection to said semi-frozen confection dispensing conduit means;

a second mixer housed in said syrup refrigerating cylinder and having a rotation axis coinciding with the central axis of said syrup refrigerating cylinder, and providing for delivery of the syrup to said semi-frozen confection dispensing conduit means;

first drive means for providing rotation of said first mixer; and second drive means for providing rotation of said second mixer, wherein said second mixer is controlled by said control means to enable a higher speed of rotation when said second mixer sends the syrup to said semi-frozen confection dispensing conduit means than when said second mixer stirs the syrup being refrigerated in said syrup refrigerating cylinder.

12. An apparatus for preparing a semi-frozen confection according to claim 11 further comprising:

a first selection switch for selecting, from the programs stored in said memory means, a program for controlling the operation of said freezing cylinder based on the temperature of the main ingredient of the semi-frozen confection;

a second selection switch for selecting, from the programs stored in said memory means, a program for controlling the temperature of the syrup;

first temperature setting means for setting the temperature of the main ingredient of the semi-frozen confection in the program selected through said first selection switch; and second temperature setting means for setting the temperature of the syrup in the program selected through the second selection switch.

13. An apparatus for preparing a semi-frozen confection according to claim 11 further comprising:

first rotating speed adjusting means for adjusting the rotating speed of said first drive means while said control means controls the rotating speed of said first drive means when the semi-frozen confection is dispensed; and second rotating speed adjusting means for adjusting the rotating speed of said second drive means while said control means controls the rotating speed of said second drive means when the semi-frozen confection is being dispensed.

14. An apparatus for preparing a semi-frozen confection according to claim 12 further comprising:

third selection switch for selecting, from the programs stored in said memory means, a program for controlling the operation of said freezing cylinder based on the driving current of said first drive means; and driving current setting means for setting the driving current of said first drive means in the program selected through said third selection switch.

15. An apparatus for preparing a semi-frozen confection according to claim 14 further comprising a selection switch enabling the operation of said freezing cylinder to be controlled either based on the temperature of the main ingredient of the semi-frozen confection prepared in said freezing cylinder, or based on the driving current of said first drive means, wherein said first temperature setting means and said driving current setting means comprise the same setting means.

16. An apparatus for preparing a semi-frozen confection according to claim 10 wherein said reference value input means comprises a variable resistor.

17. An apparatus for preparing a semi-frozen confection according to claim 10 wherein said program selection input means comprises a switch of the push type.

18. An apparatus for preparing a semi-frozen confection according to claim 10 wherein said reference value input means comprises a digital setting device and a D/A converter.

19. An apparatus for preparing a semi-frozen confection according to claim 10 further comprising:

specific program selection input means for selecting only specific programs corresponding to the preparation conditions to be adjusted in the operation mode;

reference value updating input means for updating the reference values preliminarily set through said reference value input means to values corresponding to the preparation conditions of the semi-frozen confection, in the programs selected through said specific program selected input means.

20. An apparatus for preparing a semi-frozen confection according to claim 19 further comprising set value displaying means for displaying numerical values to be set in the specific programs, wherein the numerical values are displayed in accordance with a manipulation of said reference value updating means due to a control executed by said control means.

21. An apparatus for preparing a semi-frozen confection according to claim 10 further comprising set value displaying means for displaying the numerical value to be set in the programs, wherein the numerical values are displayed in accordance with a manipulation of said reference value input means on said set value displaying means due to a control executed by said control means.

22. A control method enabling control means of an apparatus for preparing a semi-frozen confection to set reference values in programs while in an adjustment mode permitting to adjust conditions for preparing the semi-frozen confection, comprising:
- a first step wherein an operation for selecting through program selection input means a program corresponding to a preparation condition to be adjusted, is executed;
- a second step of setting counting means to a counted value n according to the manipulation of said program selection input means;
- a third step of comparing said counted value n with a predetermined value N;
- a fourth step wherein, when said counted value n is below said predetermined value N, timing means starts counting time;
- a fifth step of selecting a program corresponding to the number n from the programs stored in said memory means, displaying the number n on measured value displaying means and displaying on set value displaying means a reference value to be set in said program in response to the manipulation of reference value input means;
- a sixth step of comparing time t counted by said counting means with a predetermined time T;
- a seventh step of writing the reference value in said memory means in the case that said program selection input means is operated once while the time t is below the predetermined time T, and shifting to an operation mode for preparing the semi-frozen confection when the time t is above the predetermined time T; and
- an eighth step of setting said counting means to a counted value (n+1) according to the operation of said program selection input means executed in the seventh step, and of returning to the third step.

23. A control method according to claim 22 further comprising:
- a ninth step of, when the counted value n exceeds the predetermined value N, selecting the program corresponding to the number n from the programs stored in said memory means, displaying the number n on said measured value displaying means and displaying on said set value displaying means a reference value to be set in said program in response to the manipulation of said reference value input means;
- a tenth step of writing the reference value in said memory means in the case that said program selection input means is operated once; and
- an eleventh step of setting said counting means to the counted value (n+1) in response to the tenth step, and, when the counted value (n+1) exceeds the biggest number of the programs, returning to the fourth step after resetting and setting said counting means to numerical value one.

* * * * *

UNITED STATES PATENT AND TRADEMARK OFFICE
CERTIFICATE OF CORRECTION

PATENT NO. : 5,159,818

DATED : November 3, 1992

INVENTOR(S) : Ryoukichi Etou; Kinji Hashizume; Mitsuo Ikeda and Hideo Asada

It is certified that error appears in the above-identified patent and that said Letters Patent is hereby corrected as shown below:

Title page, item: [75], change the listing of inventors as follows:

Ryoukichi Etou; Kinji Hashizume; Mitsuo Ikeda and Hideo Asada, All of Ibaraki, Japan, 567

Title page, item: [73], change Assignee to Nissei Refrigeration Ltd., Osaka-fu, Japan Signed and Sealed this Twenty-first Day of December, 1993

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,159,818
DATED : November 3, 1992
INVENTOR(S) : Ryoukichi Etou, et. al.

It is certified that error appears in the above-indentified patent and that said Letters Patent is hereby corrected as shown below:

On the Title page, item [73], Assignee: should read--Nissei Refrigeration Ltd., Osaka-fu, Japan--.

Signed and Sealed this

Twenty-sixth Day of April, 1994

*Attest:*

BRUCE LEHMAN

*Attesting Officer*    Commissioner of Patents and Trademarks